(12) United States Patent
Navarro

(10) Patent No.: US 11,156,202 B2
(45) Date of Patent: Oct. 26, 2021

(54) WIND GUIDE SYSTEM FOR WIND TURBINES

(71) Applicant: WINNOWAVE SL, Madrid (ES)

(72) Inventor: Sonsoles Navarro, Madrid (ES)

(73) Assignee: WINNOWAVE, SL, Madrid (ES)

(*) Notice: Subject to any disclaimer, the term of this patent is extended or adjusted under 35 U.S.C. 154(b) by 0 days.

(21) Appl. No.: 16/759,313

(22) PCT Filed: Oct. 24, 2018

(86) PCT No.: PCT/EP2018/079122
§ 371 (c)(1),
(2) Date: Apr. 24, 2020

(87) PCT Pub. No.: WO2019/081563
PCT Pub. Date: May 2, 2019

(65) Prior Publication Data
US 2020/0300213 A1   Sep. 24, 2020

(30) Foreign Application Priority Data

Oct. 25, 2017 (DK) .......................... PA 2017 00601

(51) Int. Cl.
*F03D 1/04*    (2006.01)

(52) U.S. Cl.
CPC ............ *F03D 1/04* (2013.01); *F05B 2240/13* (2013.01)

(58) Field of Classification Search
CPC ......... F03D 1/04; F05B 2240/13; Y02E 10/72
See application file for complete search history.

(56) References Cited

U.S. PATENT DOCUMENTS

| | | | |
|---|---|---|---|
| 2009/0295164 A1* | 12/2009 | Grabau | F03D 1/0658 290/55 |
| 2009/0297332 A1* | 12/2009 | Boyd | F03D 1/04 415/1 |
| 2010/0032956 A1* | 2/2010 | Varrichio | F03D 13/20 290/55 |

(Continued)

FOREIGN PATENT DOCUMENTS

| | | |
|---|---|---|
| DK | 177081 B1 | 6/2011 |
| WO | 2014/098632 | 6/2014 |
| WO | 2016166385 | 10/2016 |

OTHER PUBLICATIONS

International Search Report and Written Opinion concerning International Application No. PCT/EP2018/079122 dated Oct. 25, 2017.

*Primary Examiner* — Joseph Ortega
(74) *Attorney, Agent, or Firm* — Kunzler Bean & Adamson

(57) ABSTRACT

A wind guide system is disclosed for guiding the wind in front of and/or above a wind turbine from a first direction to a second direction is disclosed. The wind guide system comprises a wind guide arranged and configured to receive wind in front of and/or above a wind turbine and to change the direction of the wind so that the wind leaving the wind guide has another direction than the wind received by the wind guide. The wind turbine comprises a tower and a rotor provided with a number of rotor blades. The wind guide is arranged and configured to change the direction of the wind so that the wind leaving the wind guide will increase the wind speed of the wake behind the rotor by adding or leading some of the surrounding wind into the wake.

14 Claims, 16 Drawing Sheets

(56) References Cited

U.S. PATENT DOCUMENTS

| | | | |
|---|---|---|---|
| 2010/0260592 A1* | 10/2010 | Chen | F03D 1/04 415/1 |
| 2012/0086214 A1* | 4/2012 | Roskey | F03D 1/02 290/55 |
| 2013/0309081 A1 | 11/2013 | Hjort | |

* cited by examiner

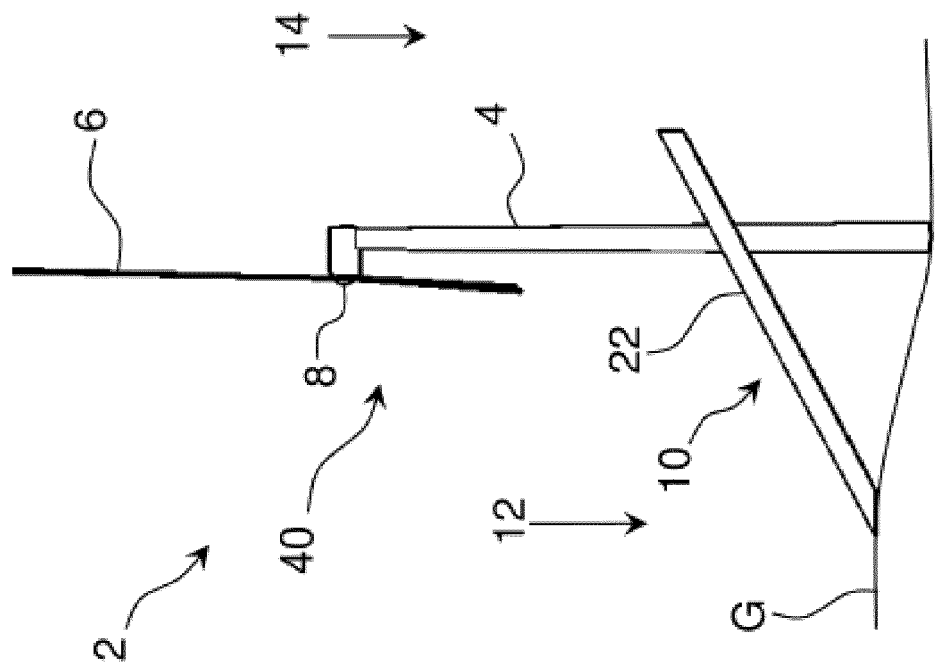
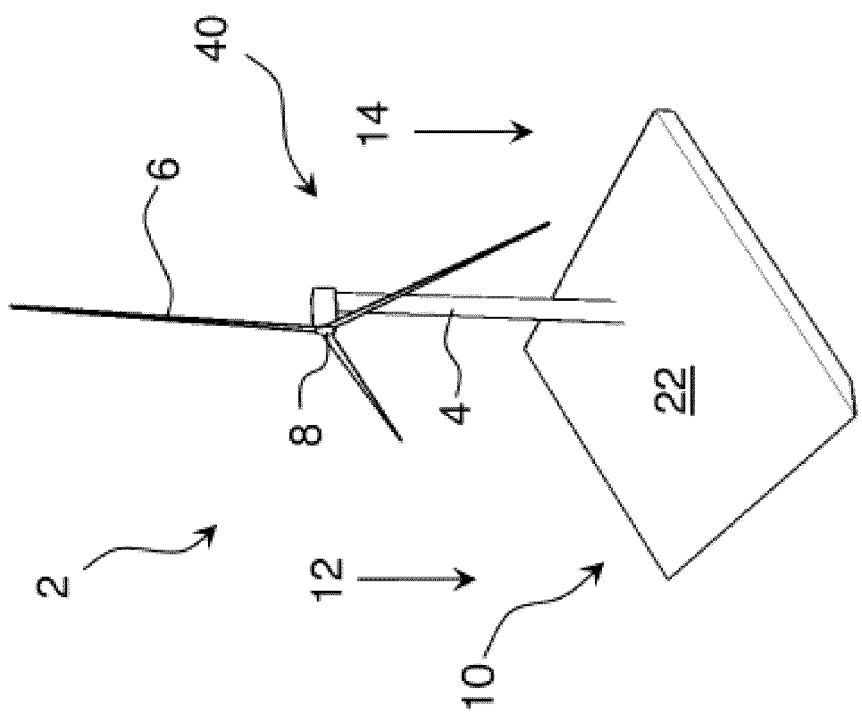

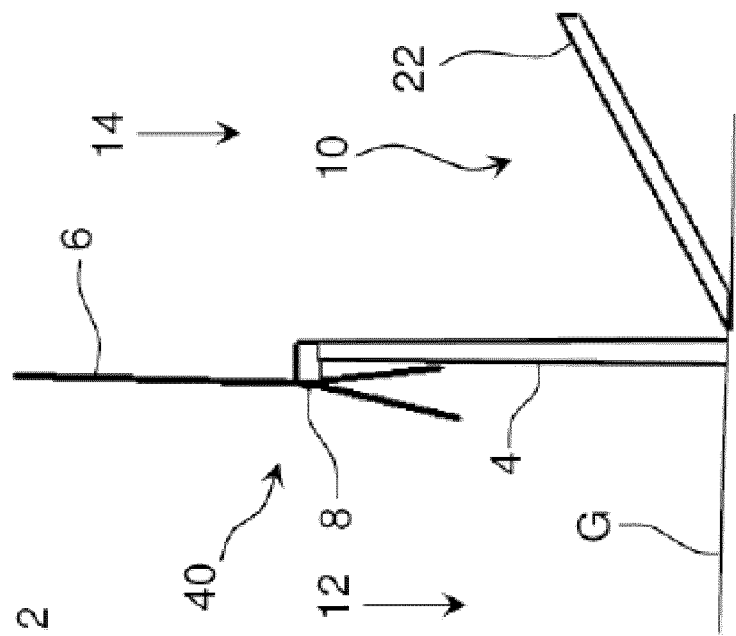
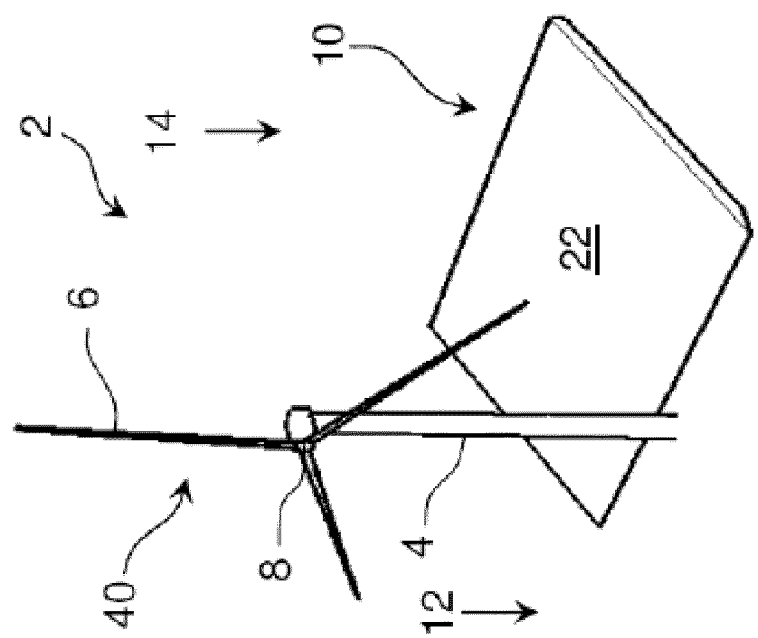

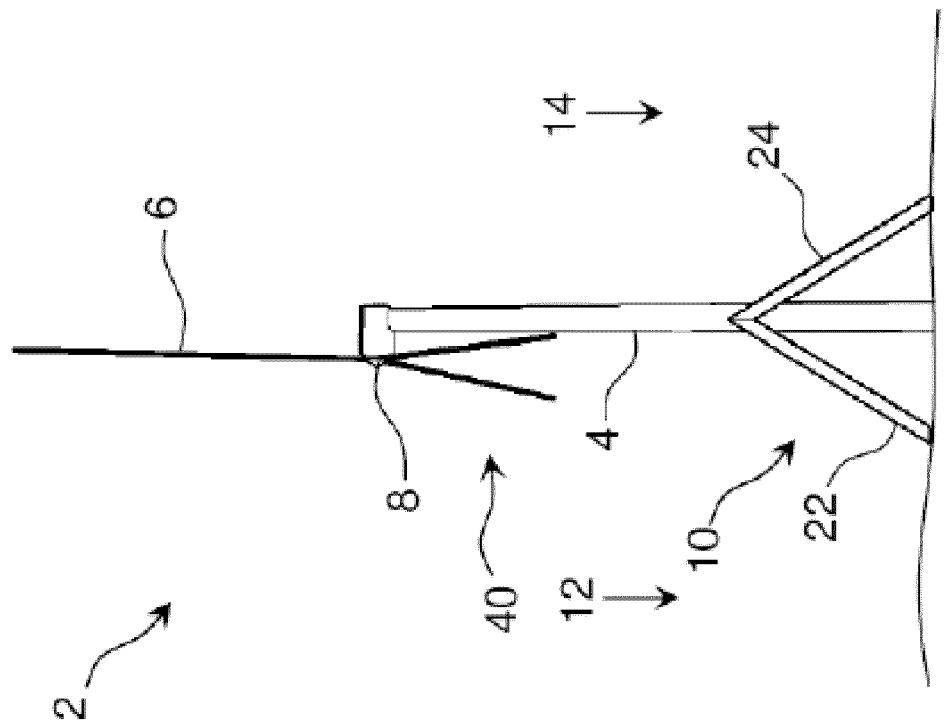
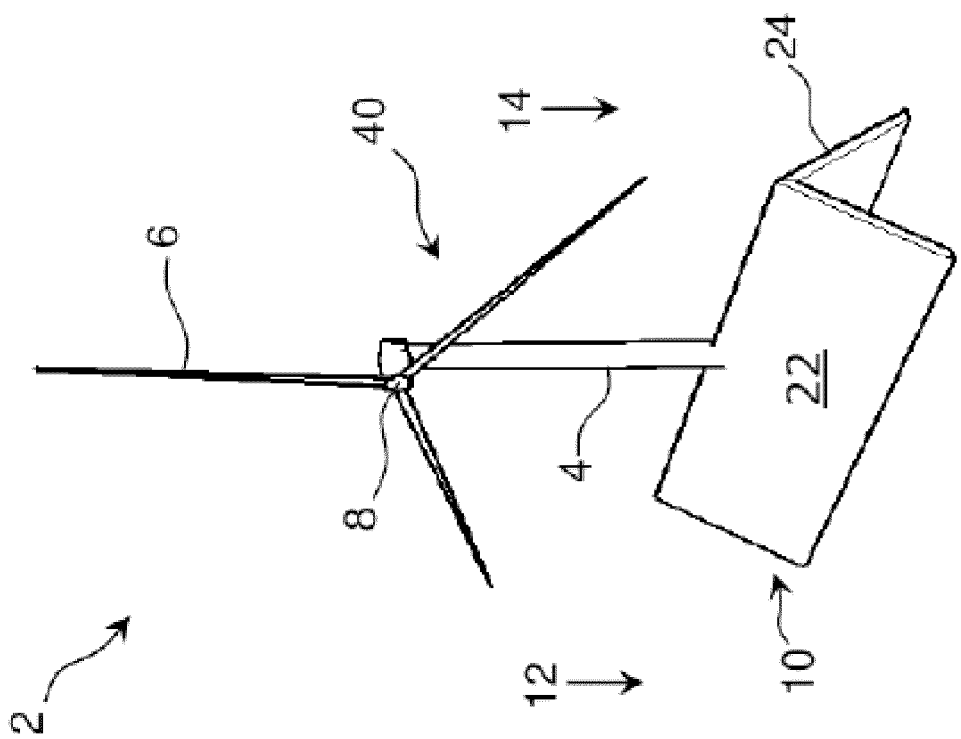

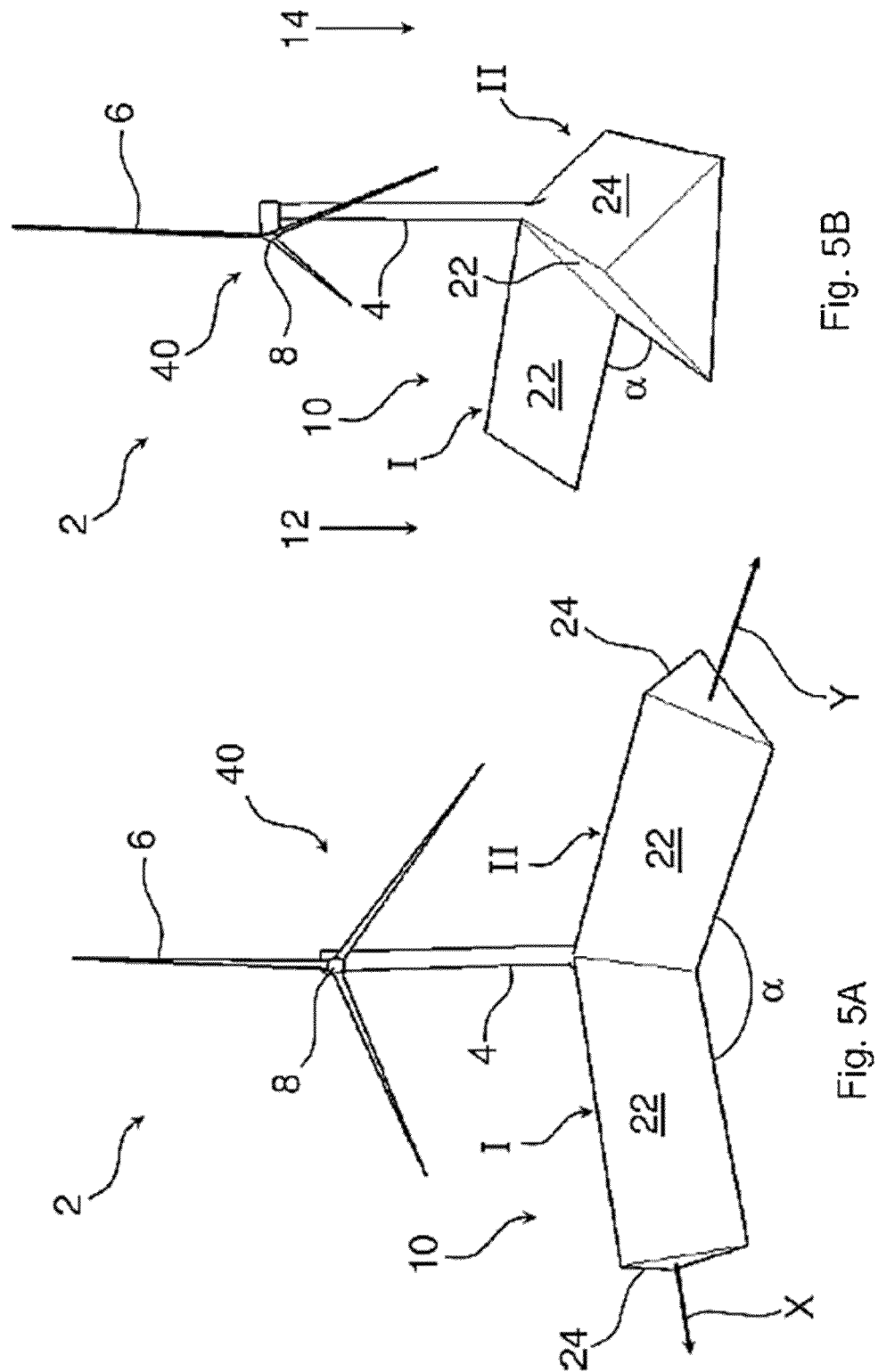

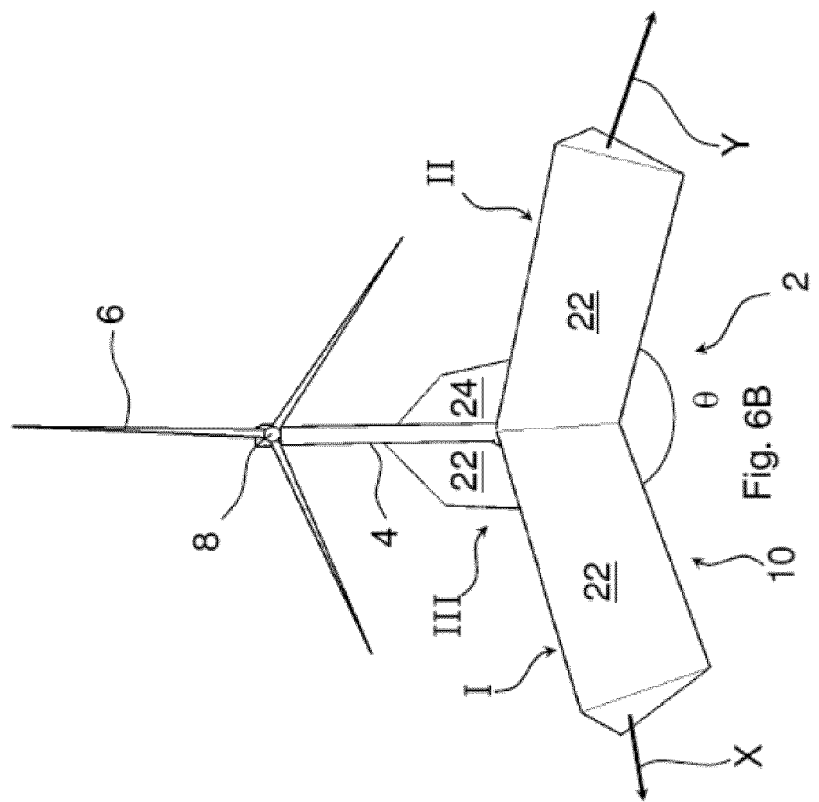
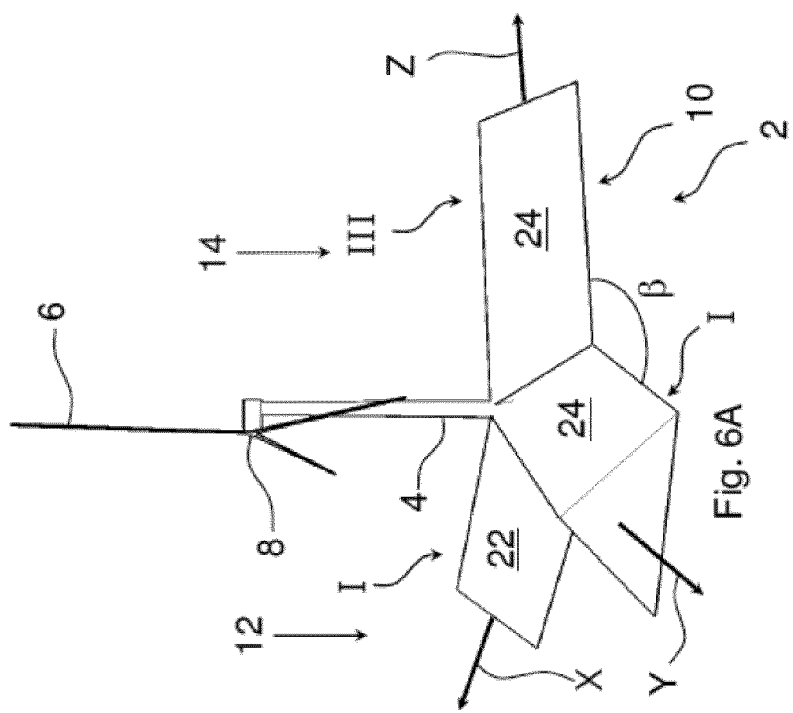

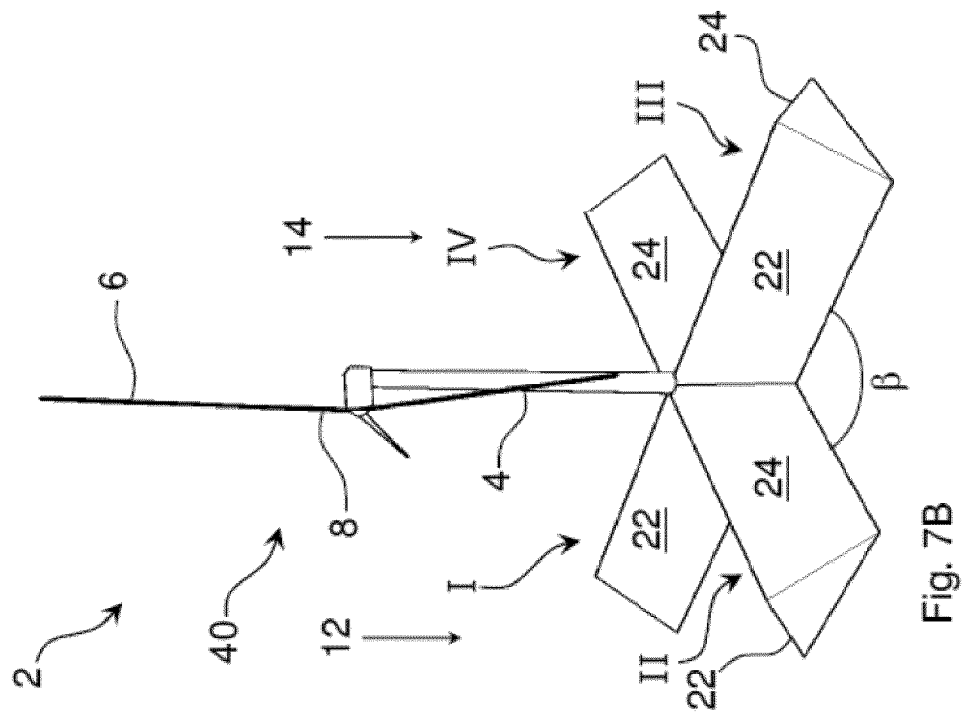
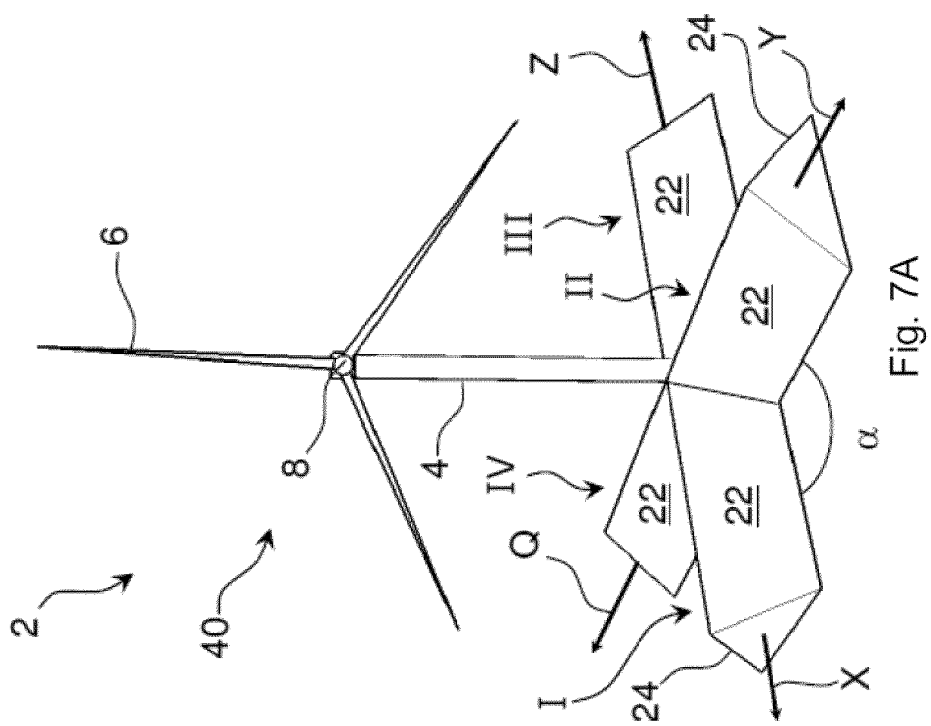
Fig. 7A
Fig. 7B

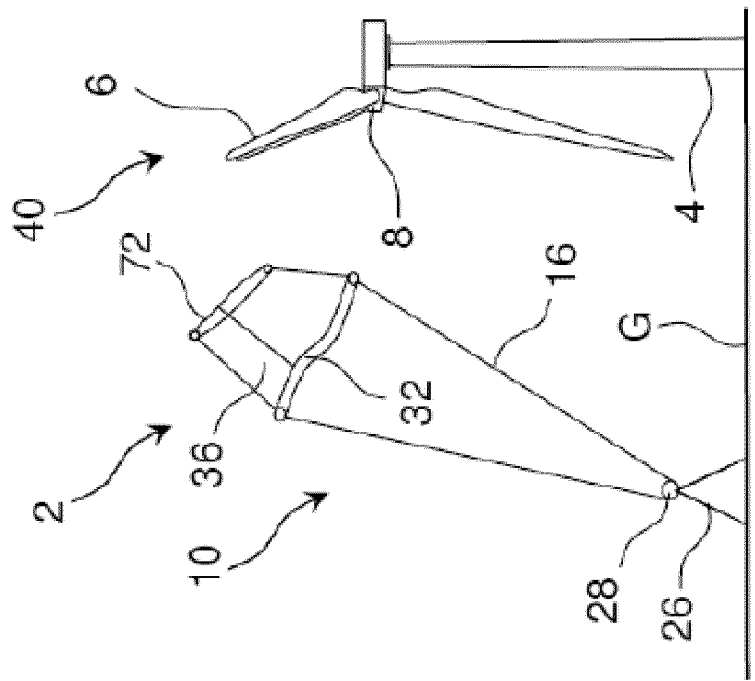
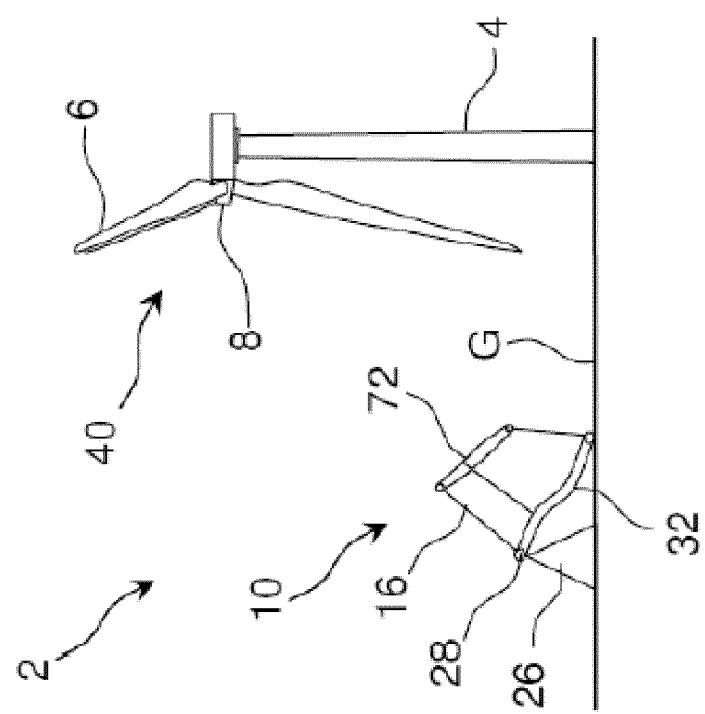
Fig. 10A
Fig. 10B

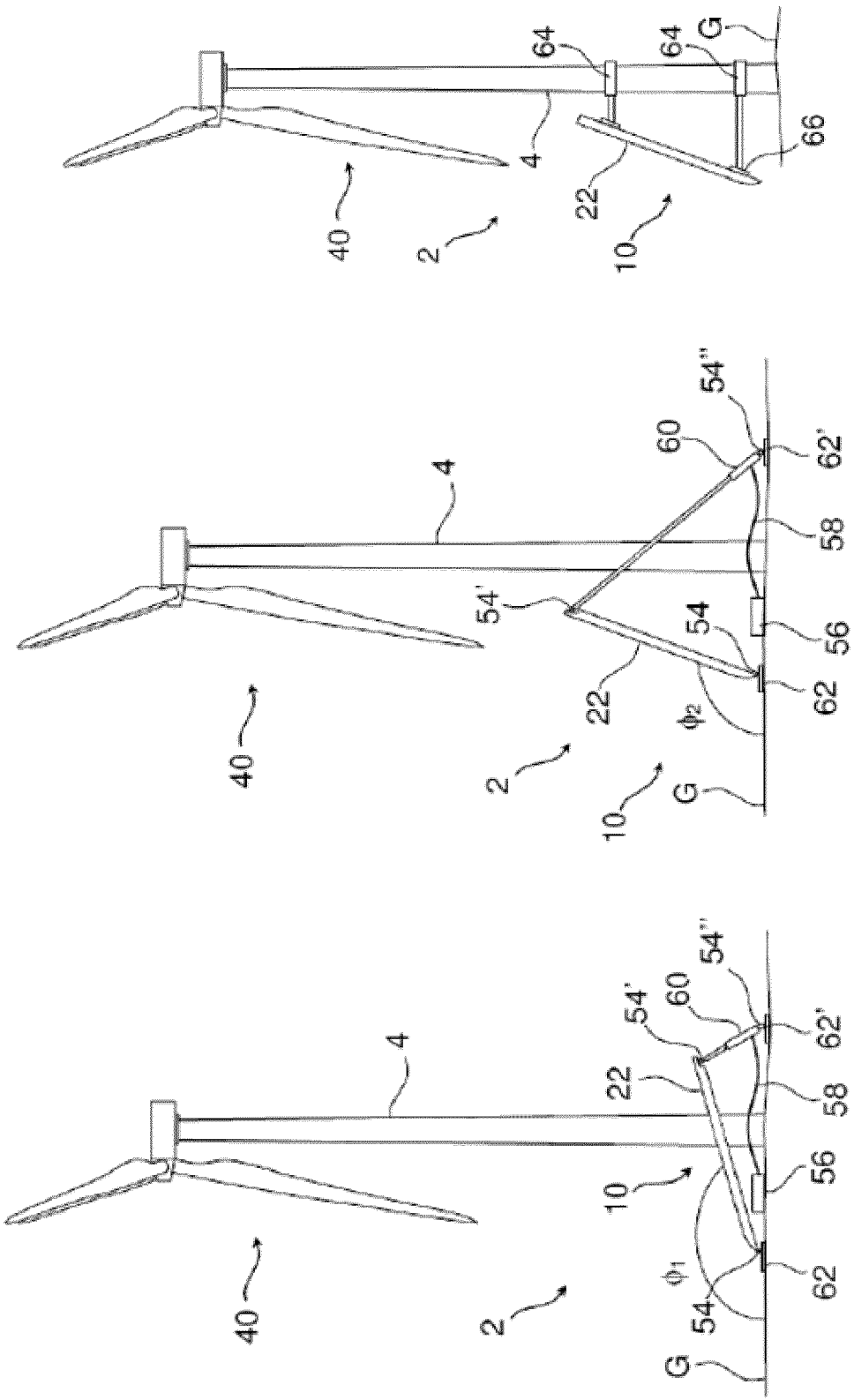

$$F' + F'' + W = F$$

WIND GUIDE SYSTEM FOR WIND TURBINES

This application claims the benefit of the Danish Patent Application PA 2017 00601 filed on Oct. 25, 2017.

FIELD OF INVENTION

The present invention relates to a system and a method for optimizing the climatic conditions of a site in order to increase the energy production rate of wind turbines. The present invention more particularly relates to a system and a method to speed up the wind in the area behind the rotor of the turbine in order to increase the energy production rate of wind turbines.

PRIOR ART

The Danish patent DK177081B1 discloses a method and a system for increasing the output of a wind turbine, wherein one or more flow surfaces are placed at a wind turbine. At lower wind speeds, the flow surfaces are set to guide the wind up towards the rotor of the wind turbine and hence take advantage of the Venturi effect in the rotor. At higher wind speeds, the flow surfaces are completely or partially taken out of the flow of the wind. DK177081B1 shows how to install speed-increasing surfaces around a wind farm to exploit the Venturi effect in order to increase the wind speed in front of the turbine and/or to expand the wake behind the turbine.

However, it would be desirable to find other systems to enable such wind speed increase before and/or behind the rotor of the turbine more efficiently and cost effectively, as it will be explained later on.

Additionally, one major challenge in many wind farms is that a wind turbine operating in the wake of another turbine has a reduced power production due to a lower incident wind speed. This has become an ever increasing problem as the number of large wind farms comprising many turbine generators have steadily increased in the last decades. Accordingly, there has been an increasing focus on the challenges associated with the grouping of turbines in wind farms. Research has shown a reduction of 10% in power output for three turbines separated by seven rotor diameters. For full wake conditions, power losses of downstream turbines are found to be 30-40%, whereas losses of 5-8% have been reported when averaged over different wind directions.

Lastly, another main challenge of wakes in wind farms is that they create a higher turbulence intensity which shortens the lifetime of the rotor blades as well as other turbine components.

Accordingly, it would be desirable to be able to increase power production in a given turbine, reduce power losses due to wakes and improve the lifetime of the key components of the wind turbines.

Thus, there is a need for a method and a system which reduces or even eliminates the above-mentioned disadvantages of the prior art.

SUMMARY OF THE INVENTION

In a first aspect, a wind guide system for guiding wind in front of and/or above a wind turbine from a first direction to a second direction to direct the wind surrounding the rotor swept area to an area behind the rotor swept area is provided. The wind turbine comprises a tower and a rotor provided with a number of rotor blades defining a rotor swept area.

The wind guide system comprises a wind guide arranged and configured to receive wind surrounding the rotor swept area, e.g. in front of and/or above and/or behind and/or in the sides of the wind turbine rotor, and to change the direction of the wind so that the wind leaving the wind guide has another direction than the wind received by the wind guide. In addition, the wind guide is arranged and configured to direct the wind surrounding the rotor swept area to an area behind the rotor swept area in such a way that in the area behind the rotor the wind speed is increased and the wind pressure is reduced.

Hereby, an increase in power production of the wind turbine can take place in a more cost-effective and efficient manner than in the prior art. In addition, a reduction of the wake effect can be achieved and power losses derived from the wake effects created by other wind turbines may thus be reduced. Loads on the rotor blades and other main components of the turbine can also be reduced.

In this disclosure, a rotor swept area refers to the area of the circle created by the blades when the rotor rotates.

In this disclosure, directing the wind surrounding the rotor swept area to an area behind the rotor swept area shall be understood as substantially directing the wind surrounding the rotor swept area to the area behind the rotor swept area without interfering with the rotor swept area. This is to say, that no substantially wind from the surroundings of the rotor is introduced into the rotor swept area.

The wind guide system according to the present invention does not achieve its benefits in the wind farms solely through a Venturi effect for increasing the speed of the wind directed towards the rotor as the solution disclosed in DK177081B1. Instead of applying the Venturi effect to speed up the wind in front of the rotor, the system according to the present invention primarily leads the flow from the area around the turbine rotor, into the area behind the rotor, e.g. into the wake of the turbine, preferably very close to the rotor. Hereby, it may be possible to achieve the following effects and advantages.

When leading the flow into the wake, the wind speed behind the swept area of the rotor, e.g. in the wake, is increased in a direction primarily away from the rotor and thereby it may be possible to generate a lower pressure just behind the rotor. This produces a gradient of pressure with respect to the pressure just before the rotor of the wind turbine.

This gradient of pressure will increase wind speed across the rotor, and hereby ultimately increase the energy production. Accordingly, the energy efficiency of the rotor will be increased.

The rotor extracts energy from the wind by reducing the wind speed. Consequently, the pressure is significantly lower just behind the rotor. The wind guide system according to the invention adds energy in form of added kinetic energy due to the increased wind speed in the wake and hereby the reduced pressure drops across the rotor.

When leading the flow into the area just behind the rotor or wake, the turbulence experienced by the rotor does not increase significantly. The incoming turbulence will be approximately the same because the wind guide system does not substantially add wind in front of the rotor. The wind guide system generates much turbulence in the wake and that helps to dissipate it faster. The rotor, however, will experience this increased turbulence to a marginal extent, because the wind guide system barely interferes with the incoming flow.

Especially in low turbulence wind farms, the principle of the system according to the invention will be advantageous.

The park efficiency will be significantly increased as the wind guide system installed close to a first wind turbine will increase the efficiency of this first wind turbine and will contribute effectively to dissipate the wake and ensure turbulent mixing with the surrounding flow. Therefore, the as the wake is reduced, the efficiency of other wind turbines installed behind the first wind turbine will also be increased. For example, production losses as much as 50% have been recorded for a second turbine compared to the first turbine, with less than 3 rotor diameters between the two turbines. The wake is surrounded by very strong blade tip vortices and the entire wake is also rotating in the opposite direction to the rotor. The wake can be identified as far as rotor diameters behind the first turbine in low turbulence wind farms.

By adding wind to the wake, the wind guide system will contribute to dissipate more effectively the wake and parts of the tip vortices. Both the tip vortices and the wake vortex will take turbulent kinetic energy from the flow, resulting in less wind energy to extract by the rearmost turbine. That effect will be significantly reduced when reducing or eliminating the vortices in the wake. Vortices are relatively stable and keep extracting turbulent kinetic energy from the flow behind the rotor for up to several minutes.

Random turbulence (large scale or small scale) will be reduced much faster than the vorticity turbulence, and therefore the wake will recover much faster, and therefore the wake will be losing less energy and speed, and therefore there will be more energy to extract for the rearmost turbine.

The wind speed behind the rotor, e.g. in the wake, can be as low as only half the wind speed in front of the rotor depending on the controller settings in the turbine. Adding flow into the low wind speed wake instead of into the high wind speed flowing in front of the wind turbine, will therefore relatively result in a larger speed up of the wind. The amount of added kinetic turbulent energy is the same, but the relative speed up will be larger.

Another advantage compared to DK177081B1 is the direction relative to horizontal of the flow from the wind guide. In DK177081B1, the flow should be close to horizontal when it reaches the rotor to achieve a good efficiency of the turbine (and lower loads). Accordingly, the turbine can only more or less exploit the horizontal component of the wind. By blowing the wind into the area behind the rotor, this is not so vital. Even an almost vertical wind flow that blows the wake upwardly, may increase energy production significantly, because it would remove some of the low speed flow behind the rotor, and thereby generating a lower pressure behind the rotor.

CFD simulations of different versions of the concept disclosed in DK177081B1, has shown that it is difficult to avoid large wind shear loads on the rotor, caused by the added flow. It was found that any obstacle, even an aerodynamic shape, will result in very high speed up at a very small part close to the lower part of the rotor. This will generate much higher loads, especially fatigue loads on the blades and thereby on the turbine and it will increase the risk of the blade tips hitting the tower (a design constraint on most modern turbines). With the wind guide system according to the invention, this effect will be very small, because we improve the turbine efficiency by reducing the pressure behind the turbine.

The pressure drop will be distributed over a larger area of the rotor. Besides, since the wind speed is significantly lower behind the rotor than in front of the rotor, the added flow will be likely to penetrate much higher vertically, when we add the flow behind the rotor because there will simply not be so much horizontal wind speed to bend the added flow towards the horizontal direction.

When the turbines are spaced closely, e.g. 3-5 rotor diameters between the turbines, the load increase caused by the wakes can be very large. When the rearmost turbine is running only partly in the wake of the front turbine, the load increase is very large, because the blades experience significantly lower wind speed in the wake part of the incoming wind. This problem can be partly solved by the wind guide system according to the invention hereby prolonging the lifetime of existing turbines and/or reducing the cost of new turbines in wind farms.

Wake meandering is a phenomenon often experienced in wind farms. The wake drift forth and back, making it much more difficult for the rearmost turbines (the turbines arranged behind the front turbine) to do adjustments to reduce the loads. Regardless of the cause, the wind guide system according to the invention can partly or fully destroy the wake, and thereby also reduce or eliminate the problems with wake meandering.

One problem of the prior art is that the surfaces or sail structures need to be adjusted quite accurately relatively to the wind direction to reduce extra loads caused by the yaw error, or rather the extra loads caused by the difference in wind direction between the free wind and the added wind by the surfaces. This problem is much less relevant with the wind guide system according to the invention. One can add some fixed structures like wall-like structures that do not need to be moved relatively to the wind direction. In some cases, the surfaces will blow the wake partly sideways, which will also help to mix the wake with the surrounding free wind and thereby reduce the wake effect.

The wind guide may be any suitable object such as a plate-shaped surface, wind sails or spoilers configured to lead the wind into the area just behind the rotor, e.g. the wake.

In some examples, the wind guide can be fully or partly taken out of the wind flow, when the wind speed is very high. This is to limit the loadbearing requirements for the wind guide, and thereby the cost of the structures and their foundations, if those are needed.

In some examples, the structures can also be somehow adjusted according to wind speed and/or wind direction. E.g. the ground mounted wall can be tilted according to the wind speed (it may need a different angle position relative to the ground for optimizing the actual turbine efficiency) and/or turned around the turbine to adjust to the actual wind direction.

Also, the wall does not necessarily consist of one flat wall. It can be two or more half walls besides the turbine, positioned in an angle.

The invention can be applied to any horizontal-axis wind turbine regardless of its rotor diameter or maximum power output.

The rotor may have a rotor diameter between 3 and 150 metres, e.g. larger than 3, 5, 10, 20, 25, 30, 35, 40, 45, 50, 55, 60, 65, 70, 75, 80 meters or even more. In some examples, the rotor diameter may be between 30 and 150 meters, and optionally between 50 and 150 meters.

The maximum power output of the wind turbine may be between 20 kW and 15000 kW, e.g. 20 kW, 40 kW, 60 kW, 80 kW, 100 kW, 150 kW, 200 kW, 250 kW, 300 kW, 350 kW, 400 kW, 500 kW, 600 kW, 700 kW, 800 kW, 900 kW, 1000 kW, 1200 kW, 1400 kW, 1600 kW, 1800 kW, 2000 kW, 3000 kW, 4000 kW, 5000 kW, 6000 kW, 7000 kW, 8000 kW, 9000 kW, 10000 kW or even more. In some examples, the power output may be between 20 kW and 10000 kW, and optionally between 700 kW and 10000 kW.

In some examples, the wind guide may comprise a surface that is angled relative to horizontal. Hereby, the wind guide is capable of changing horizontal wind velocity components to vertical wind velocity components. Thus, the wind guide can guide wind towards the wake behind the rotor.

This surface that is angled relative to horizontal may be configured in such a manner that horizontal wind will be guided in a vertical direction by the surface so that the wind leaving the wind guide has a non-zero vertical velocity component, being directed downwardly or upwardly. Hereby, the wind guide can add wind to the wake and hereby increase the wind speed in the wake.

In some examples, the wind guide may comprise a ground-mounted wind guide structure, said wind guide structure being arranged on the ground. Hereby, its position and/or orientation can easily be controlled. In these examples, the wind guide may guide the wind in front of the wind turbine, but not the wind above the rotor of the wind turbine.

Alternatively, the wind guide may comprise a ground-mounted wind guide structure, said wind guide structure comprising a sail member attached to an attachment portion arranged on the ground or on an anchoring structure device arranged on the ground. Hereby, the sail member can be fixed to the ground and the wind above and/or at rotor level, e.g. in front of the rotor, can be guided into the wake by means of the wind guide. In contrast to the examples wherein the wind guide structure is mounted on the ground, in these examples the sail member may guide the wind in front and/or above the wind turbine. In this disclosure a sail member shall be understood as a wind guide that may pivot with respect to an attachment portion or on an anchoring structure arranged on the ground by the action of the wind. The sail member may thus be held and oriented by the wind.

In the examples of a wind guide structure comprising a sail member, the wind guide system may comprise a dragging member (preferably formed as a kite) configured to drag and lift a guiding surface of the wind guide system hereby enabling the guiding surface to be brought from a first un-deployed configuration where the guiding surface is arranged on the ground to a second configuration, in which the guiding surface is deployed above the rotor of the turbine.

Regardless if the wind guide structure is mounted on the ground or comprises a sail member; at least a portion of the wind guide may be arranged in front of the tower of the wind turbine. Hereby, it may be possible to add wind flow into the area just behind the rotor, increasing the wind speed in the wake just after the rotor. This will cause a higher effect of speeding wind and giving more time for the wake to dissipate after the rotor.

In some of these examples, the entire wind guide may be arranged in front of the tower of the wind turbine.

At least a portion of the wind guide may be arranged behind the tower of the wind turbine, e.g. in wind guides mounted on the ground. Hereby, wind can be "sucked" from the wake by means of a wind flow generated by the wind guide.

In some of these examples, the entire wind guide may be arranged behind the tower of the wind turbine.

The wind guide may be attached to the tower of the wind turbine. Hereby, the orientation and/or position of the wind guide can easily be controlled.

In some examples, the surface is angled 0-40 degrees, preferably 10-30 degrees, such as 15-25 degrees relative to vertical. For example, the surface may be angled 20 degrees relative to vertical. In other examples, the wind guide surface may be substantially vertical. Hereby, it may be possible to guide the wind in an optimum direction in order to maximize the wind speed in the wake.

The wind guide may further comprise several separate segments angled relative to each other. Hereby, it may be possible to provide a wind guide system that is capable of guiding wind in an optimum manner that is only dependent of the wind direction to a limited extent.

In some examples, the height of the wind guide structure may be comprised between one third and two thirds of the height from the ground to the rotor. The height, i.e. the distance between the ground and the top portion of the wind guide, may be for example two thirds of the height from the ground to the rotor. Hereby, it may be possible to guide wind towards the wake in a manner, in which the wind speed in the wake is high.

By the height from the ground to the rotor is meant the distance between ground and the tip of the rotor blades when they are in their lowest vertical position.

The distance between the top portion of the wind guide structure and the tip of the rotor blades when they are in their lowest vertical position may be between one third and two thirds of the height h from the ground to the rotor, e.g. one third.

In some examples, the wind guide structure may be moveably arranged relative to the tower. Hereby, it may be possible to change the position and/or orientation of the wind guide structure e.g. in order to adjust for local conditions.

The wind guide system may additionally comprise an actuator arranged and configured to bring the wind guide structure from a first configuration to a second configuration, where the wind guide structure is positioned and/or oriented differently in the first configuration than in the second configuration.

In further aspect, a wind guide system for guiding wind in front of a wind turbine from a first direction to a second direction to direct the wind surrounding the rotor swept area to both the rotor swept area and an area behind the rotor swept area is provided. The wind turbine comprises a tower and a rotor provided with a number of rotor blades defining a rotor swept area. The wind guide system comprises a wind guide arranged and configured to receive wind surrounding the rotor swept area and to change the direction of the wind so that the wind leaving the wind guide has another direction than the wind received by the wind guide. In addition, the wind guide is arranged and configured to direct the wind surrounding the rotor swept area to both the rotor swept area and an area behind the rotor swept area in such a way that the wind speed is increased in both the rotor swept area and in the area behind the rotor swept area.

According to this aspect, the wind guide system may be at least partially arranged in front of the wind turbine. The wind guide system may comprise a ground-mounted wind guide structure or a sail member pivoting with respect to the ground. The configuration of this wind guide system may be according to any of the examples herein disclosed.

For example, in those cases wherein the wind guide system comprises a sail member pivoting with respect to the ground, the wind guide system may comprise a first guiding surface configured to channelling the wind flow towards the wake and a second guiding surface configured to channelling the wind towards the rotor of the wind turbine. Therefore, using a sail member attached to the ground, the wind surrounding the rotor may be directed towards the rotor and behind the rotor.

In yet a further aspect, wind guide system having a wind guide arranged at an angle of 0°-30° with respect to a vertical axis is provided. The wind guide comprises a structure configured to be anchored to the ground comprising two external supporting masts and one or more internal supporting masts for supporting a surface for guiding the wind. The surface comprises a concave shape and extends from one external supporting mast to the other external supporting mast through the one or more internal supporting masts.

According to this aspect, the surface may be made from a non-structural material, e.g. flexible textile material. The wind guide system may thus be more cost-effective and easier to be installed than known wind guide system.

The wind guide according to this aspect may be arranged in front and/or behind a wind turbine according to any of the examples herein described.

In the examples wherein the wind guide is arranged in front of the wind turbine, the wind guide system speeds up the wind entering into the rotor swept area and into the area behind the rotor swept area. A portion of the wind flowing towards the rotor is quickly blocked by the surface of the wind guide in such a way that the direction of the wind changes from a first direction to a second direction substantially vertical. The wind is consequently speeded up. After the wind guide, the wind returns to the first direction. The wind quickly returns to the initial direction and therefore does not experience a channelling effect.

The concave shape of the surface allows increasing the area in contact to the wind for a given height. Therefore, as more wind experiences the effect of the wind guide system, higher wind speeds through the rotor swept area may be achieved.

In some examples, the length of the wind guide between the external supporting masts may be superior to the diameter of the rotor of the wind turbine. Accordingly, wind surrounding the rotor swept area may be directed towards the rotor swept area and towards an area behind the rotor swept area.

In some examples, the external supporting masts are taller than the internal supporting masts. The height surface may thus be higher in the external regions and shorter in the central region. The blocking effect may therefore be higher in the external regions than in the central region. The wind surrounding the rotor may thus be directed towards the rotor area.

In some examples, the height of the surface may be adapted to the wind, i.e. controlled. The surface may be connected to the top portion of the supporting masts. In some of these examples, the surface may be lowered to a position below the top portion, e.g. in the central portion of the supporting masts. Accordingly, the height of the surface may be lower than the height of the supporting masts in some parts of the wind guide. For example, the height may substantially decrease from one external supporting mast to the other external mast. Wind speed may thus be different in the lateral sides of the rotor swept area. In other examples, the whole surface may lowered and the wind speed may thus be reduced.

In yet a further aspect, a method for guiding wind in front of and/or above a wind turbine from a first direction to a second direction is provided. The wind turbine comprises a tower (4) and a rotor provided with a number of rotor blades (6) defining a rotor swept area. The method applies a guide system comprising a wind guide arranged and configured to receive wind surrounding the rotor swept area and to change the direction of the wind so that the wind leaving the wind guide has another direction than the wind received by the wind guide, wherein the method comprises the following step:

arranging the wind guide in a position and orientation, in which it is arranged and configured to direct the wind surrounding the rotor swept area to an area behind the rotor swept area (18) in such a way that in the area behind the rotor the wind speed is increased and the wind pressure is reduced.

Hereby, a speed-up of wind behind the turbine rotor can be attained, a reduction of the wake effect can be achieved and loads on turbine components can be reduced.

DESCRIPTION OF THE DRAWINGS

The invention will become more fully understood from the detailed description given herein below. The accompanying drawings are only given by way of illustration, and thus, they are not limitative of the present invention. In the accompanying drawings:

FIG. 2A shows a perspective view of a wind guide system according to one example of the invention;

FIG. 2B shows a side view of the wind guide system shown in FIG. 2A;

FIG. 3A shows a perspective view of a wind guide system according to one example of the invention;

FIG. 3B shows a side view of the wind guide system shown in FIG. 3A;

FIG. 4A shows a perspective view of a wind guide system according to one example of the invention;

FIG. 4B shows a side view of the wind guide system shown in FIG. 4A;

FIG. 5A shows a perspective view of a wind guide system according to one example of the invention;

FIG. 5B shows a side view of the wind guide system shown in FIG. 5A;

FIG. 6A shows a perspective view of a wind guide system according to one example of the invention;

FIG. 6B shows a side view of the wind guide system shown in FIG. 6A;

FIG. 7A shows a perspective front view of a wind guide system according to one example of the invention;

FIG. 7B shows a side view of the wind guide system shown in FIG. 7A;

FIG. 10A shows a side view of one example of a wind guide system according to the invention, wherein the wind guide structure is a first sail member to be dragged and lifted from the ground by a second sail member;

FIG. 10B shows a side view of the wind guide system shown in FIG. 10A, wherein a first sail member is being dragged and lifted by a second sail member towards its final position above the of the wind turbine;

FIG. 11A shows a side view of one example of a wind guide system according to the invention, wherein the wind guide system comprises a rotatably arranged surface arranged in a lowered position;

FIG. 11B shows a side view of the wind guide system shown in FIG. 11A, wherein the surface is arranged in an upright position;

FIG. 11C shows a side view of one example of a wind guide system according to the invention, wherein the wind guide system comprises a wind guide structure attached to the tower of a wind turbine;

DETAILED DESCRIPTION OF THE INVENTION

Figure 1A:
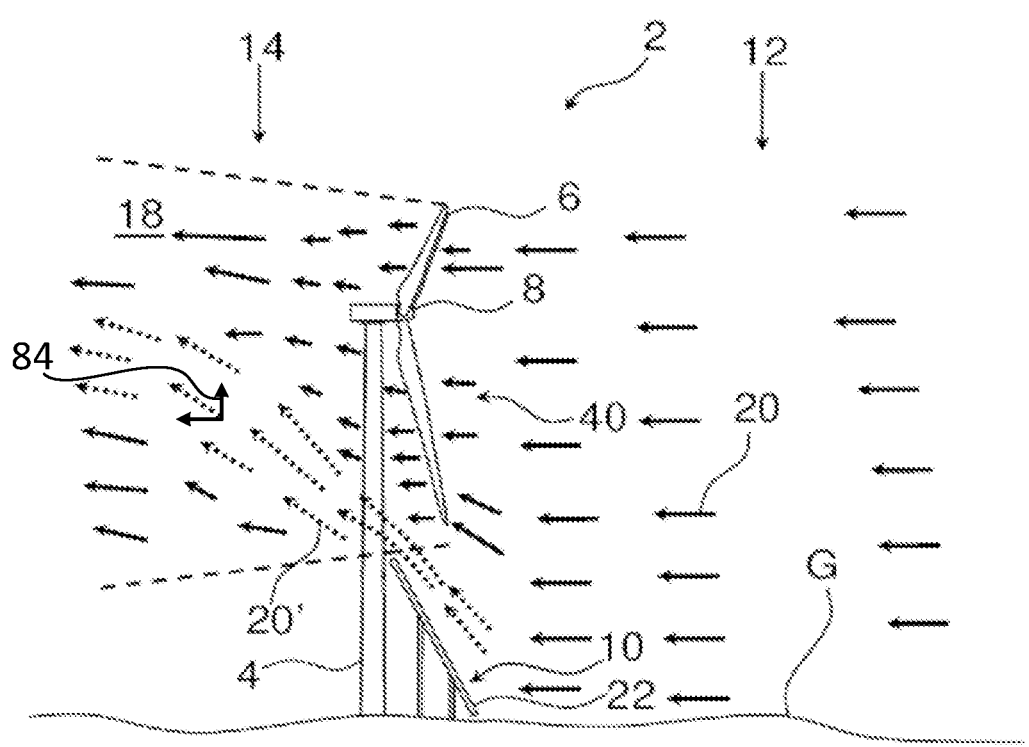
FIG. 1A shows a side view of a wind guide system according to one example of the invention, wherein the flow created by the wind guide structure of the invention is shown.

FIG. 1A is a side view of a wind guide system 2 according to one example of the invention.

The wind guide system 2 comprises a wind guide structure 10 arranged in front of a ground-mounted wind turbine 40. The wind guide structure 10 is arranged on the ground G in the front side 12 of the wind turbine 40. The wind guide structure 10 comprises a plate-shaped first surface 22 that is angled approximately 20 degrees relative to vertical. The angle between the first surface 22 and vertical may be different, e.g. between 0 degrees and 85 degrees, optionally between 0 degrees and 45 degrees. In one embodiment according to the invention, the angle between the first surface 22 and vertical is approximately 15 degrees. In another embodiment according to the invention, the angle between the first surface 22 and vertical is approximately 25 degrees. In a further embodiment according to the invention, the angle between the first surface 22 and vertical is approximately 30 degrees. In an even further embodiment according to the invention, the angle between the first surface 22 and vertical is approximately 35 degrees. In another embodiment according to the invention, the angle between the first surface 22 and vertical is approximately 40 degrees. In a further embodiment according to the invention, the angle between the first surface 22 and vertical is approximately 45 degrees. In another embodiment according to the invention, the angle between the first surface 22 and vertical is approximately 50 degrees. In a further embodiment according to the invention the angle between the first surface 22 and vertical is approximately 55 degrees. In another embodiment according to the invention, the angle between the first surface 22 and vertical is approximately 60 degrees. In a further embodiment according to the invention, the angle between the first surface 22 and vertical is approximately 65 degrees. In another embodiment according to the invention, the angle between the first surface 22 and vertical is approximately 70 degrees. In a further embodiment according to the invention, the angle between the first surface 22 and vertical is approximately 75 degrees. In another embodiment according to the invention, the angle between the first surface 22 and vertical is approximately 80 degrees. In a further embodiment according to the invention, the angle between the first surface 22 and vertical is approximately 85 degrees.

The first surface 22 may be shaped as a plane surface. In one embodiment according to the invention the first surface 22 has a rectangular geometry. In another embodiment according to the invention, the first surface 22 has a concave geometry. In a further embodiment according to the invention the first surface 22 has a convex geometry.

The wind turbine 40 comprises a tower 4 and a nacelle arranged in the top portion of the tower 4. A rotor having three rotor blades 6 is attached to the nacelle by means of a rotating hub 8. The rotor blades 6 are attached to a pitch bearing (not shown) attached to the hub 8 that is attached to the shaft (not shown) being attached to a main frame attached to the tower 4. The rotor blades define a rotor swept area, i.e. the area defined by the circle created by the blades when the rotor rotates.

The wind 20 approaching the rotor of the wind turbine 40 is indicated with arrows. The length of the arrows indicates the wind speed, whereas the direction indicates the direction of the wind 20. It can be seen, that the wind 20 in the front side 12 approaching the rotor is essentially horizontally directed. When the wind flows through the rotor, the wind speed decreases. This is indicated by the shorter arrows in the area of the rotor and behind the rotor. The area behind the rotor swept area or wake 18 is indicated in the rear side 14 of the wind turbine 40. The wake 18 is present at the downstream, where wind speed is reduced. As the wind 20 proceeds downstream, there is a spreading of the wake 18. The "wake effect" has a negative influence on the energy production of the wind turbine 40. Accordingly, it is an object of the invention to speed up the wind 20 in the wake 18 behind the rotor swept area by leading some of the surrounding wind 20 at a higher velocity into the rotor swept area 18.

The wind guide structure 10 is arranged and configured to lead the wind 20 in the front side 12 (approaching the wind turbine 40) into the wake 18 from the area below the rotor. The wind 20' that has been guided by the wind guide structure 10 is indicated by dotted arrows. These arrows are angled upwardly relative to the horizontal direction. Because the wind 20' guided by the wind guide structure 10 is angled upwardly, relative to the horizontal direction, the wind 20' has a non-zero vertical velocity component 84 (i.e., a vertical component of a velocity vector of the wind 20' is non-zero). Accordingly, the wind guide structure 10 is leading the guided wind 20' into the wake 18. Hereby, the guide wind 20' increases the wind speed in the wake 18. The wind guide structure does not direct wind from the front side 12 towards the rotor swept area, i.e. towards the blades 6. Accordingly, the pressure behind the rotor will be reduced and the gradient of pressure before and after the rotor will increase, which will lead to an increase in wind speed before the rotor which will increase ultimately the power production of the turbine 40. Additionally, the present invention makes it possible to provide a wind guide system 2 and a method for reducing the wake-induced power losses. Moreover, the present invention makes it possible to provide a wind guide system 2 which extends the lifetime of the key turbine components of other wind turbines in the wind farm, that are located in the wake of the turbine 40.

As it will be explained with reference to the remaining figures, the wind guide structure 10 can be positioned above the rotor, beside the rotor, below the rotor or in any combination thereof. The wind guide system 2 and the method according to the invention can be used both for stand-alone/individual wind turbines 40 and for turbines 40 in a wind farm.

Figure 1B:
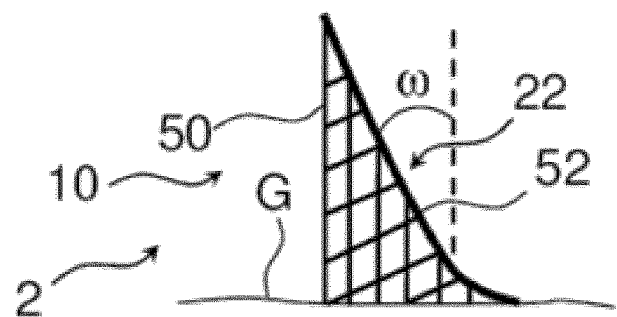
FIG. 1B shows a schematic side view of a wind guide structure of a wind guide system according to one example of the invention.

FIG. 1B illustrates a schematic side view of one example of a wind guide structure 10 of a wind guide system 2 to the invention. The wind guide structure 10 is configured to be arranged on the ground G in front of a wind turbine, e.g. directly anchored to the ground. The wind guide structure 10 comprises a mechanical grid structure 50 and a cover structure 52 attached thereto. The cover structure 52 may be made in any suitable material including a fabric cover or a tarpaulin made of a durable material such as a plastic material for example. The surface 22 may be rigid or flexible. The wind guide structure 10 will include supporting structures and mechanisms so that the surface 22 is kept in a desired position and orientation and hereby is capable of performing its function. The wind guide structure 10 comprises a first surface 22 provided in an angle ω relative to vertical.

Figure 1C:
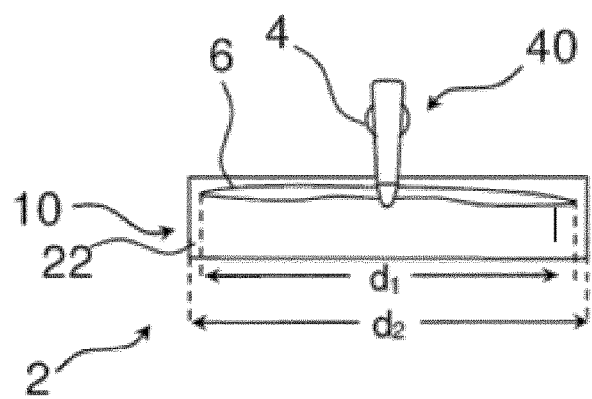
FIG. 1C shows a top view of a wind guide structure of a wind guide system according to one example of the invention.

FIG. 1C illustrates a schematic, top view of a wind guide system 2 according to the invention. The wind guide system 2 basically corresponds to the one shown in FIG. 1A. The wind guide system 2 comprises a wind guide structure 10 arranged at the ground in front of a wind turbine 40. The wind guide structure 10 comprises a rectangular first surface 22 provided below the rotor and thus the rotor blades 6 of the wind turbine 40. The surface 22 has a width d2 that is larger than the rotor diameter d1. In another embodiment, however, the surface 22 may have a width d2 that is smaller than or equal to the rotor diameter d1. The surface 22 has a front portion arranged in front of the rotor. The surface 22 has a rear portion arranged behind the rotor and in front of the tower 4 of the wind turbine 40.

Figure 1D:
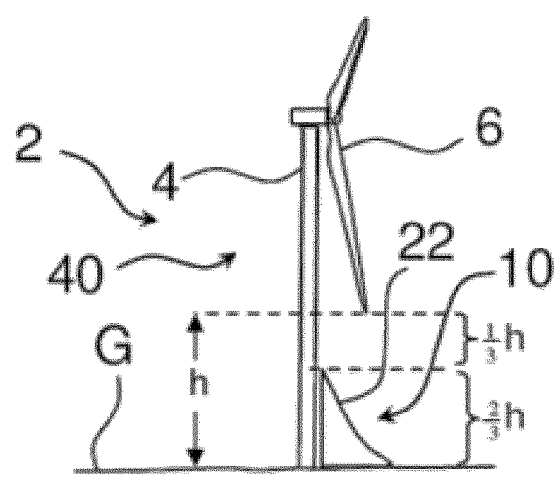
FIG. 1D shows a side view of a wind guide system according to one example of the invention.

FIG. 1D illustrates a side view of a wind guide system 2 according to the invention. The wind guide system 2 comprises a wind guide structure 10 arranged at the ground in front of a wind turbine 40 having a tower 4 and a rotor with three rotor blades 6 to a nacelle arranged on the top of the tower 4. The wind guide structure 10 comprises a concave first surface 22 arranged below the rotor. The surface 22 has a front portion arranged in front of the rotor and a rear portion arranged behind the rotor and in front of the tower 4 of the wind turbine 40.

The height of the wind guide structure 10 corresponds to two thirds of the height h from the ground G to the rotor (the tip of the rotor blades 6 when they are in their lowest vertical position). Accordingly, the distance between the top portion of the wind guide structure 10 and the rotor is one third of the height h from the ground G to the rotor.

FIG. 2A illustrates a perspective view of a wind guide system 2 according to one example of the invention, whereas FIG. 2B illustrates a side view of the wind guide system 2 shown in FIG. 2A. The wind guide system 2 comprises a plate-shaped wind guide structure 10 comprising a surface 22 having a rectangular geometry. The angle between the surface 22 and the vertical may be smaller than indicated in FIG. 2A and FIG. 2B.

The wind guide structure 10 rests on the ground G in front of a wind turbine 40 comprising a tower 4 and a nacelle arranged in the top portion of the tower 4. A rotor having three rotor blades 6 is rotatably attached to the nacelle by means of a hub 8. The wind guide structure 10 is attached to the tower 4. In another embodiment according to the invention, the wind guide structure 10 comprises support structures extending between the backside of the surface 22 and the ground G.

The wind guide structure 10 extends from the front side 12 of the wind turbine 40 into the rear side 14 of the wind turbine 40. In another embodiment according to the invention, the wind guide structure 10 is arranged in the front side 12 of the wind turbine 40 and does not extend into the rear side 14 of the wind turbine 40.

FIG. 3A illustrates a perspective view of a wind guide system 2 according to one example of the invention, whereas FIG. 3B illustrates a side view of the wind guide system shown in FIG. 3A. The wind guide system 2 comprises a plate-shaped wind guide structure 10 comprising a surface 22 having a rectangular geometry. The angle between the surface 22 and the vertical may be smaller than indicated in FIG. 3A and FIG. 3B.

The wind guide structure 10 rests on the ground G behind the wind turbine 40. The wind turbine 40 comprises a tower 4 and a nacelle arranged in the top portion of the tower 4. The wind turbine 40 furthermore comprises a rotor having three rotor blades 6 rotatably attached to the nacelle by means of a hub 8. The wind guide structure 10 is arranged in the rear side 14 of the wind turbine 40 and does not extend into the front side 12 of the wind turbine 40.

FIG. 4A illustrates a perspective view of a wind guide system 2 according to one example of the invention, whereas FIG. 4B illustrates a side view of the wind guide system 2 shown in FIG. 4A. The wind guide system 2 comprises a wind guide structure 10 comprising a first surface 22 having a rectangular shape and a second surface 24 having a rectangular shape. The two surfaces 22, 24 are joint in a ridge provided in the top portion of each surface 22, 24. The tower 4 intersects the central portion of the ridge. The first surface 22 is arranged in the front side 12 of the wind turbine 40, whereas the second surface 24 is arranged in the rear side 14 of the wind turbine 40.

The free end of each of two surfaces 22, 24 rests on the ground G. The wind guide structure 10 is basically symmetrically arranged with respect to a vertical plane extending parallel to the rotor and intersecting the longitudinal axis of the tower 4.

FIG. 5A illustrates a perspective front view of a wind guide system 2 according to one example of the invention, whereas FIG. 5B illustrates another perspective view of the wind guide system 2 shown in FIG. 5A. The wind guide system 2 comprises a wind guide structure 10, comprising a first segment I extending along a longitudinal axis X and a second segment II extending along a longitudinal axis Y. The segments I, II are attached to each other. Each segment I, II may basically correspond to the wind guide structure 10 shown in FIG. 4A and FIG. 4B. The longitudinal axis X of the first segments I and the longitudinal axis Y of the second segment II are angled relative to each other. The angle α between the longitudinal axes X, Y is illustrated in FIG. 5A and FIG. 5B. The angle α between the longitudinal axes X, Y may be about 120 degrees and 140 degrees. In one embodiment according to the invention the angle α between the longitudinal axes X, Y is about 120 degrees. In another embodiment according to the invention, the angle α between the longitudinal axes X, Y is about 100 degrees. In a further embodiment according to the invention the angle α between the longitudinal axes X, Y is about 130 degrees. In an even further embodiment according to the invention the angle α between the longitudinal axes X, Y is about 140 degrees.

Each segment I, II comprises a first surface 22 and second surface 24. The wind guide structure 10 is attached to the tower 4 of a wind turbine 40 having a rotor with three rotor blades 6 attached to the hub 8 rotatably attached to a nacelle arranged in the top portion of the tower 4. The first surfaces 22 of the segments I, II of the wind guide structure 10 are arranged in the front side 12 (in front of the tower 4). The rearmost portion of the second surfaces 24 of the segments I, II of the wind guide structure 10 are arranged in the rear side 14 (behind the tower 4).

FIG. 6A illustrates a perspective side view of a wind guide system 2 according to one example of the invention, whereas FIG. 6B illustrates a perspective front of the wind guide system 2 shown in FIG. 6A. The wind guide system 2 comprises a wind guide structure 10 comprising a first segment I, extending along a longitudinal axis X, a second segment II extending along a longitudinal axis Y and a third segment III extending along a longitudinal axis Z. The angle β between the longitudinal axis Y of the second segment II and the longitudinal axis Z of the third segment III is indicated.

The angle β may be approximately between 140 degrees and 100 degrees, e.g. approximately 120 degrees. In another embodiment according to the invention, the angle β is approximately 130 degrees. In a further embodiment according to the invention, the angle β is approximately 140 degrees. In an even further embodiment according to the invention, the angle β is approximately 110 degrees. In another embodiment according to the invention, the angle β is approximately 100 degrees.

The between the longitudinal axis X of the first segment I and the longitudinal axis Y of the second segment II is indicated. The angle θ may be approximately between 140 degrees and 100 degrees, e.g. approximately 120 degrees. In another embodiment according to the invention, the angle θ is approximately 130 degrees. In a further embodiment according to the invention, the angle θ is approximately 140 degrees. In an even further embodiment according to the invention, the angle θ is approximately 110 degrees. In another embodiment according to the invention, the angle θ is approximately 100 degrees.

Each segment I, II, III comprises a first surface 22 and second surface 24. The wind guide structure 10 is attached to the tower 4 of a wind turbine 40 having a rotor with three rotor blades 6 attached to the hub 8 rotatably attached to a nacelle arranged in the top portion of the tower 4. The first surfaces 22 of the two first segments I, II of the wind guide structure 10 are arranged in the front side 12 (in front of the tower 4). The third segment III is arranged in the rear side 14 (behind the tower 4). In a preferred embodiment according to the invention the three segments I, II, III are symmetrically arranged with respect to the sagittal plane (spanned by the longitudinal axis of the tower 4 and the rotor axis).

FIG. 7A illustrates a perspective front view of a wind guide system 2 according to one example of the invention, whereas FIG. 7B illustrates a perspective side of the wind guide system 2 shown in FIG. 7A. The wind guide system 2 comprises a wind guide structure 10, comprising a first segment I, extending along a longitudinal axis X, a second segment II extending along a longitudinal axis Y, a third segment III extending along a longitudinal axis Z and a fourth segment IV extending along a longitudinal axis Q. The angle α between the longitudinal axis X of the first segment I and the longitudinal axis Y of the second segment II may be approximately 90 degrees. The angle β between the longitudinal axis Y of the second segment II and the longitudinal axis Z of the third segment III may also be approximately 90 degrees. The longitudinal axis X of the first segment I extends parallel to the longitudinal axis Z of the third segment III. The longitudinal axis Y of the second segment II extends parallel to the longitudinal axis Q of the fourth segment IV.

The angle β may be approximately between 90 degrees and 65 degrees, e.g. approximately 85 degrees. In another embodiment according to the invention, the angle β is approximately 80 degrees. In a further embodiment according to the invention, the angle β is approximately 75 degrees. In an even further embodiment according to the invention, the angle β is approximately 70 degrees. In another embodiment according to the invention, the angle β is approximately 65 degrees. The angle α and the angle β may vary case-by-case to optimize the flow.

The angle α between the longitudinal axis X of the first segment I and the longitudinal axis Y of the second segment II may be approximately between 90 degrees and 110 degrees, e.g. 90 degrees. In another embodiment according to the invention, the angle α is approximately 95 degrees. In a further embodiment according to the invention, the angle α is approximately 100 degrees. In an even further embodiment according to the invention, the angle α is approximately 105 degrees. In another embodiment according to the invention, the angle α is approximately 110 degrees.

Each segment I, II, III comprises a first surface 22 and a second surface 24. The wind guide structure 10 is symmetrically (with respect to the longitudinal axis of the tower 4) attached to the tower 4 of a wind turbine 40 having a rotor with three rotor blades 6 attached to the hub 8 rotatably attached to a nacelle arranged in the top portion of the tower 4.

The first segment I and the second segment II of the wind guide structure 10 are arranged in the front side 12 (in front of the tower 4). The third segment III and the fourth segment IV are arranged in the rear side 14 (behind the tower 4).

In some examples, the four segments I, II, III, IV may be symmetrically arranged with respect to the sagittal plane (spanned by the longitudinal axis of the tower 4 and the rotor axis) and/or with the frontal plane (spanned by the longitudinal axis of the tower 4 and the rotor plane).

Figure 8A:
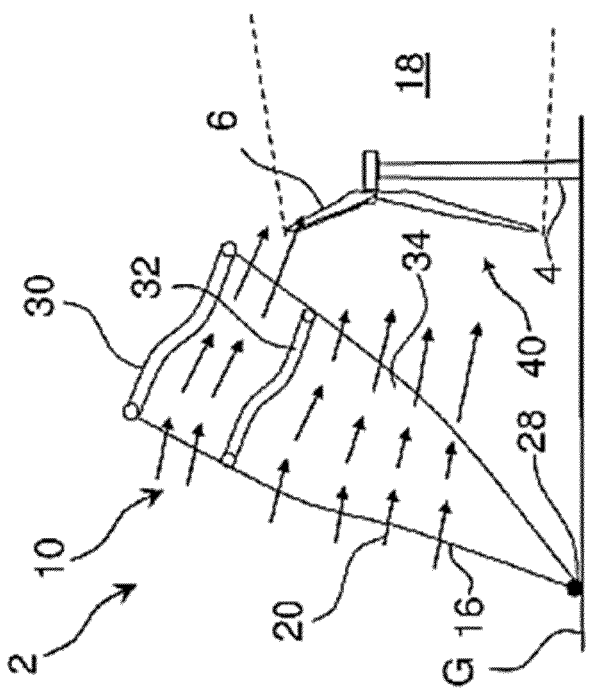
FIG. 8A shows a side view of a wind guide system according to the invention, wherein the wind guide structure is a sail member fixed (linked) to the ground behind a wind turbine.

FIG. 8A illustrates a side view of a wind guide system 2 according to one example of the invention, wherein the wind guide structure 10 is a sail member (kite) 16 fixed to the ground G behind a wind turbine 40. Wind 20 approaching the front portion of the wind turbine 40 is guided downwards when flowing through the opening area 34 of the sail member (kite) 16. The sail member 16 comprises a guiding surface 30 arranged in the top portion of the sail member 16. The wind in front and above the wind turbine is directed towards the area behind the rotor and therefore the wind speed behind the rotor is increased. The guiding surface 30 is provided in a vertical position above the tower 4 and the rotor (provided with three rotor blades 6) of the wind turbine 40.

The sail member 16 is attached to one or more attachment portions 28 located on one or more anchoring structures 26 arranged on the ground G behind the wind turbine 40. The sail member 16 guides wind 20 from the air layers above the rotor downwardly. Hereby, the wind 20 from the air layers above the rotor will speed up the wind in the wake 18 behind the wind turbine 40.

Figure 8B:
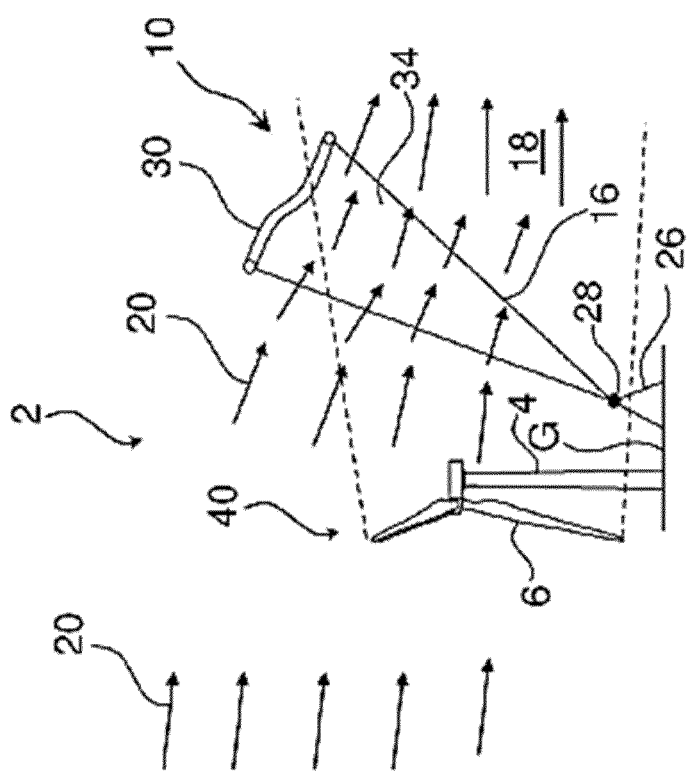
FIG. 8B shows a side view of one example of a wind guide system according to the invention, wherein the wind guide structure has two sail members, wherein the first sail member is attached to the second sail member that is fixed (linked) to the ground in front of a wind turbine.

FIG. 8B illustrates a side view of another wind guide system 2 according to the invention, wherein the wind guide structure 10 is a sail member 16 having two guiding surfaces 30, 32, fixed to the ground G in front of a wind turbine 40 having a ground mounted tower 4 and a rotor having three rotor blades 6 attached to a nacelle provided at the top portion of the tower 4. Wind 20 approaching the front part of the wind turbine 40 is guided downwards when the wind 20 flows through the sail member 16 comprising a first guiding surface 30 arranged in the top portion of the sail member 16 configured to direct wind 20 towards the wake, i.e. behind the rotor swept area, of the turbine 40 and a second guiding surface 32 arranged below the first guiding surface 30 configured to direct wind 20 towards the rotor of the wind turbine 40.

The sail member 16 is attached to one or more attachment portions 28 arranged on the ground G in front of the wind turbine 40. The sail member 16 guides wind 20 from the air layers above the rotor and at the level of the rotor downwardly. Accordingly, the wind 20 guided by the sail member 16 speeds up the wind both before the wind turbine 40 and in the wake 18 behind the wind turbine 40.

The guiding surfaces 30 and 32 of the examples illustrated in FIG. 8A or 8B may additionally comprise rigidizing elements arranged at their edges. These rigidizing elements may comprise an air chamber that when inflated can provide stiffness to the guiding surfaces and/or maintaining a certain shape.

Figure 9B:
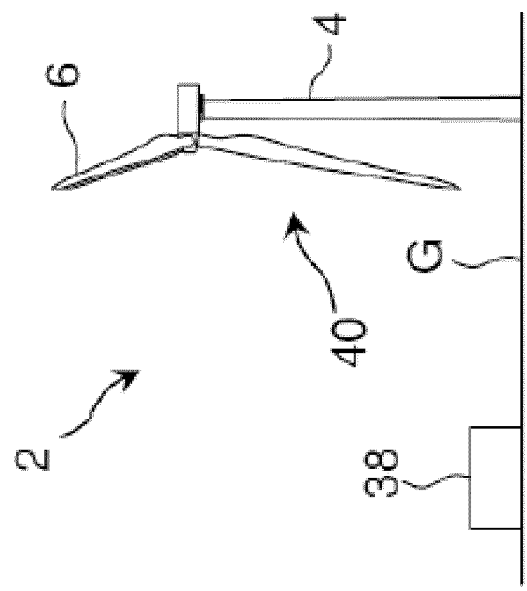
FIG. 9B shows a side view of one example of a wind guide system according to the invention, wherein the wind guide structure is one or more sail members stored in a container arranged on the ground in front of a wind turbine.
Figure 9A:
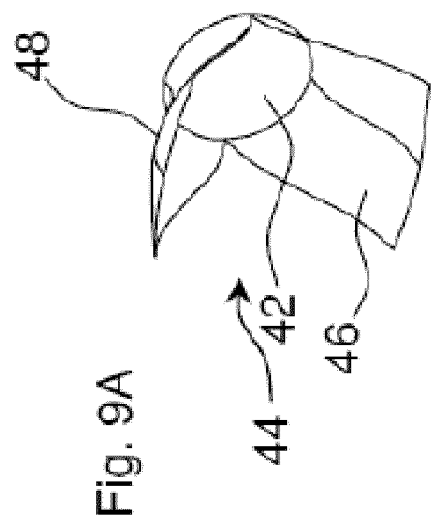
FIG. 9A shows a side view of one example of a wind guide according to the invention comprising two sail members.

FIG. 9A illustrates a side view of a wind guide 44 according to one example of the invention. The wind guide 44 comprises an upper kite structure 48 and a sail 46 attached to the lower portion of the kite structure 48. An opening 42 is provided in the wind guide 44. The wind guide 44 constitutes a flow-channeling surface configured to receive and guide wind, whereby the direction of the wind is changed from a first direction into another predefined direction.

In some examples, the wind guide 44 may comprise, in its edges, rigidizing elements, similar to the ones in the edge of a kitesurf kite, which consist on an air chamber, which inflated, can make the flow-channeling surface take a certain shape.

In an embodiment according to the invention the shape of the flow-channeling-surface is made in such a manner that it minimizes the turbulence generated in the flow and maximizes the wind speed. The shape of the kite will resemble a funnel adapted to the area swept by the rotor.

FIG. 9B illustrates a side view of a wind guide system 2 according to one example of the invention, wherein the wind guide structure is a sail member (e.g. a kite) as the one shown in FIG. 8A, FIG. 8B or FIG. 9A. The sail member is, however, in a non-deployed status due for example to adverse climatic conditions, stored in a container 38 arranged on the ground G in front of a wind turbine 40 having a tower 4 and a rotor having three rotor blades 6.

FIG. 10A and FIG. 10B illustrate the system and process through which the kite could be deployed or withdrawn according to climatic conditions at the site. FIG. 10A illustrates the presence of a dragging member 72 configured to drag the guiding surface 32 above the rotor of turbine 40.

FIG. 10B illustrates the system mid-way into full-deployment. The dragging member 72 keeps dragging the guiding surface 32 towards the upper part of the rotor. In its fully-deployed status, shown in FIG. 8B the dragging member 72 and the guiding surface 32 will be positioned above the rotor, the guiding surface 32 will have the effect as described with reference to FIG. 8B, channelling wind 20 towards the rotor of the turbine 40, and/or channelling it towards the wake.

FIG. 11A illustrates a side view of a wind guide system 2 according to one example of the invention, wherein the wind guide system 2 comprises a rotatably arranged wind guide structure 10 comprising a surface 22, wherein the wind guide structure 10 is arranged in a lowered position. FIG. 11B illustrates a side view of the wind guide system 2 shown in FIG. 11A, wherein the wind guide structure 10 is arranged in an upright position.

The wind guide structure 10 has plate-shaped portion having a surface 22. This plate-shaped portion is in a first end rotatably attached (linked) to a support structure 62 by means of a pivot 54. In the other end, the plate shaped portion having the surface 22 is rotatably attached to an actuator 60 by means of a pivot 54'. The actuator 60 is rotatably attached to a support structure 62' by means of a pivot 54". The actuator 60 is connected to a control unit 56 by means of a cable 58.

In the upright position in FIG. 11A, the angle $\phi_1$, relative to horizontal is indicated. In the upright position in FIG. 11B, the angle $\phi_2$ relative to horizontal is indicated. The $\phi_2$ may be approximately 110 degrees. The $\phi_1$ may be approximately 150 degrees.

The actuator 60 is electrical, however, in another embodiment according to the invention, the actuator 60 may be hydraulically or pneumatically driven. In one embodiment according to the invention, the wind guide system 2 comprises one or more sensors configured to detect one or more parameters including wind speed. Other parameters may be the rotational speed of the rotor, the temperatures or the air humidity. The control unit 56 may be configured to be activated on the basis of one or more parameters provided by the one or more sensors.

In one embodiment according to the invention the control unit 56 is configured to be activated on the basis of the wind speed data provided by one or more sensors. It may be advantageous that the control unit 56 is configured to bring the wind guide structure 10 in an upright position (as shown in FIG. 11A) when the wind speed data is below a predefined wind speed. It may be advantageous that the control unit 56 is configured to bring the wind guide structure 10 in a lowered position (as shown in FIG. 11B) when the wind speed exceeds a predefined level.

In the embodiment shown in FIG. 11A and FIG. 11B, the surface 22 has a slot (not shown) allowing the surface 22 to be arranged in the lowered position as shown in FIG. 11A. The slot is configured to receive the tower 4. Accordingly, the width of the slot should be equal to or larger than the diameter of the tower 4 in the section of the tower 4 being inserted into the slot.

In another embodiment according to the invention, the wind guide structure 10 may be provided entirely in front of the tower 4. Hereby, there is no need for providing a slit or slot in the surface 22.

FIG. 11C shows a side view of a wind guide system 2 according to one example of the invention, wherein the wind guide system 2 comprises a wind guide structure 10 attached to the tower 4 of a wind turbine 40. The wind guide structure 10 is attached to the lower portion of the tower 4 by means of two brackets 64 fixed to the tower 4. Connections structures extend between each bracket 64 at the tower 4 and a bracket 66 attached to the backside of the wind guide structure 10. A connection structure extends between each bracket 66 attached to the backside of the wind guide structure 10 and the corresponding bracket 64 attached to the tower 4.

In one preferred embodiment according to the invention, the wind guide structure 10 is slidably attached to the tower 4. Hereby, the position of the wind guide structure 10 can be changed by sliding the wind guide structure 10 relative to the tower 4 by means of two brackets 64 detachably attached to the tower 4.

In another embodiment according to the invention, the wind guide structure 10 is slidably attached to a track member attached to the tower 4.

Figure 12B:
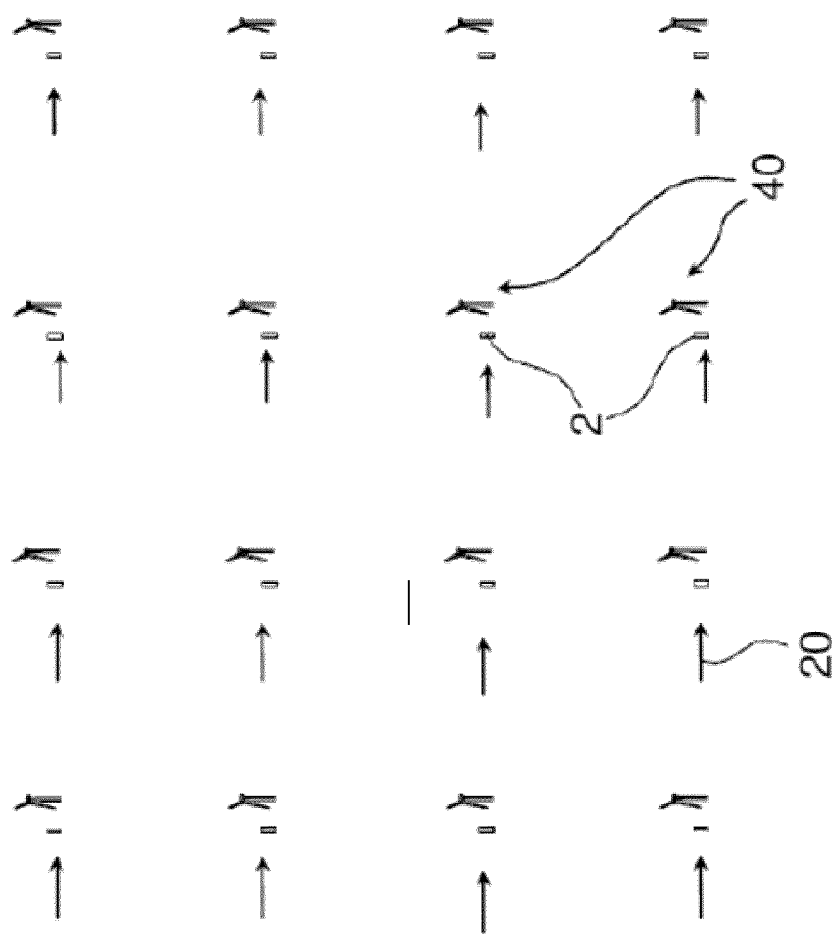
FIG. 12B shows a wind farm comprising a plurality of wind turbines and examples of wind guide systems according to the invention.
Figure 12A:
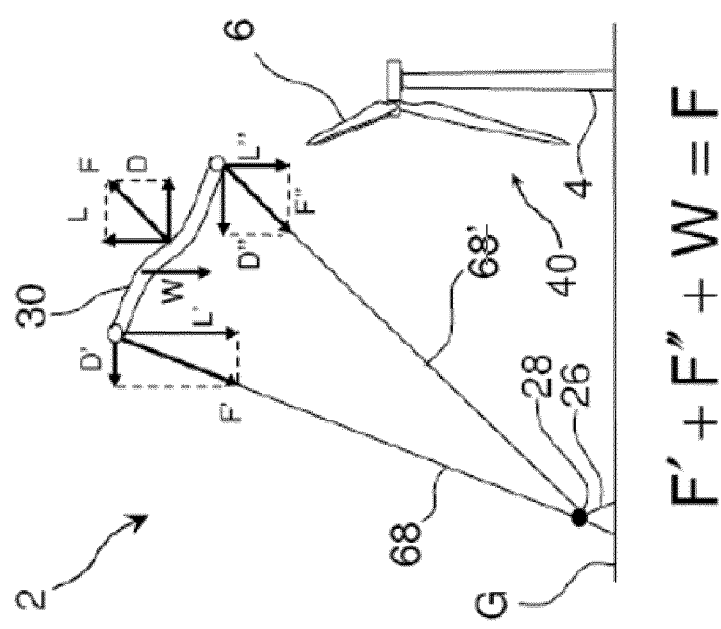
FIG. 12A shows a schematic view of one example of a wind guide system according to the invention.

FIG. 12A illustrates a schematic side view of a section (the middle section) of a wind guide system 2 according to one example of the invention. The wind guide system 2 comprises a wind guide structure 10 provided as a sail member fixed to one or more attachment portions 28 fixed to one or more anchoring structures 26 on the ground G in front of a wind turbine 40 having a ground mounted tower 4 and a rotor having three rotor blades 6 attached to a nacelle provided at the top portion of the tower 4.

As explained with reference to FIG. 8B, wind approaching the front portion of the wind turbine 40 is guided downwards when the wind flows through the sail member 16 that comprises a first guiding surface 30 arranged in the top portion of the sail member (kite) 16. Therefore, the wind above and in front the rotor may be directed towards the rotor swept area and in the area behind the rotor swept area. Even though not shown, the sail member 16 may comprise a second guiding surface arranged below the first guiding surface 30. The sail member 16 is configured to guide wind from the air layers above the rotor and at the level of the rotor downwardly. Accordingly, the wind guided by the sail member 16 speeds up the wind in the wake behind the wind turbine 40.

The sail member 16 comprises a tensioning system comprising a first wire 68, and a second wire 68' connect the attachment portion with the first guiding surface 30 which constitutes the uppermost portion of the sail member 16. The forces applied on the wires 68, 68' and on the sail member 16 are indicated in FIG. 12.

Tensioning system is configured to hold the structure and adjust the position of the sail member 16. The first wire 68 and a second wire 68' of the tensioning system are configured to hold the flow-channelling surface in the optimum position and orientation relative to the wind turbine 40 and the wind flow.

The tensioning system may comprise one, two, three, four or more wires 68, 68' depending on the wind speed.

In order to adjust the orientation of the tensioning system to different wind speeds in the site, the length of the wires 68, 68' should be adjusted in such a manner that the relative position of the sail member 16 makes the force "F" be compensated by the compound forces F'+F''+W as it is expressed in the following equation:

$$F'+F''+W=F, \qquad (1)$$

where F is the force that the wind exerts on the sail member 16, W is the weight of the sail member 16, F' is the force (tension) in the first tension wire 68 and F'' is the force (tension) in the second tension wire 68'.

The lift force L is an upward directed force that drives the sail member 16 upwards. The lift force L needs to be compensated by the weight W of the sail member 16 and the forces in the tension wires 68, 68' in order to make the sail member 16 to be sustained steady above the turbine 40. The drag force D is a horizontal force that needs to be compensated by the forces in the tension wires in order to make the sail member 16 to be sustained steady in front of the turbine 40.

In the first wire 68, the force F' is given by the sum of the drag reaction force D' and the lift reaction force L'. This can be expressed as follows:

$$F'=D'+L' \qquad (2)$$

Likewise, in the second wire 68' the force F'' is given by the sum of the drag reaction force D'' and the lift reaction force L''. This can be expressed as follows:

$$F''=D''+L'' \qquad (3)$$

In order to deploy the main sail member 16 (there may be several main sail sections), a dragging system based on using auxiliary sail members may be applied. The purpose of such dragging sail members (to drag and deploy the main sail members) may is be different from the purpose of the main sail members (to channel the wind flow to the area swept by the rotor of the turbine or to the wake) and thus, the shape will be more similar to a kite-surfing kite.

FIG. 12B illustrates a top view of a portion of a wind farm 70 comprising a plurality of wind turbines 40. A wind guide system 2 is arranged in front of every wind turbine 40 in order to increase to efficiency of the wind park 70 by reducing the wake effect as explained with reference to FIG. 1A.

Figure 13A:
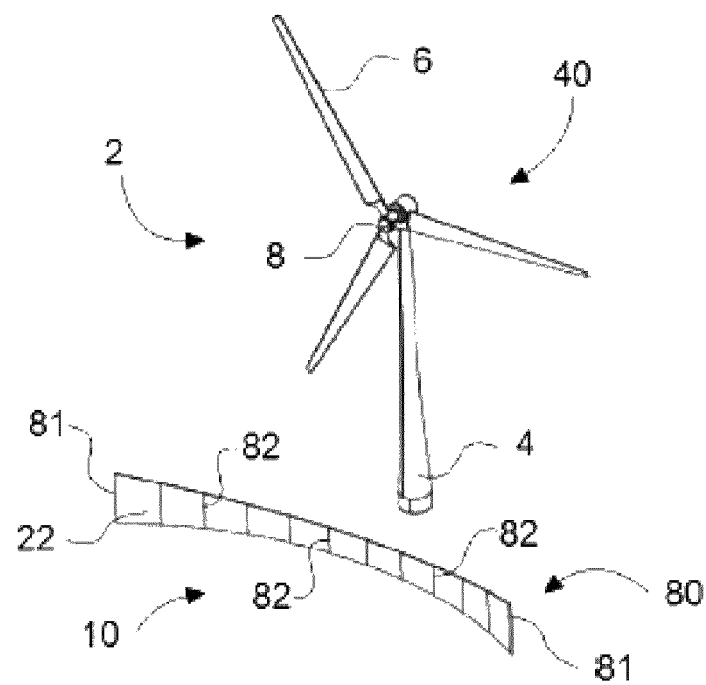
FIG. 13A shows an example of a wind guide system having a wind guide arranged at angle between 0°-30° with respect to a vertical axis.
Figure 13B:
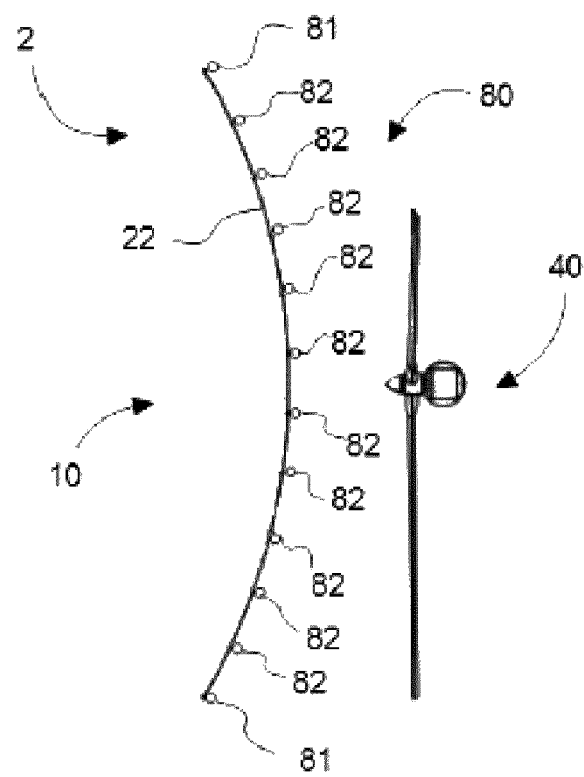
FIG. 13B shows a top view of the example shown in FIG. 13A.
Figure 13C:
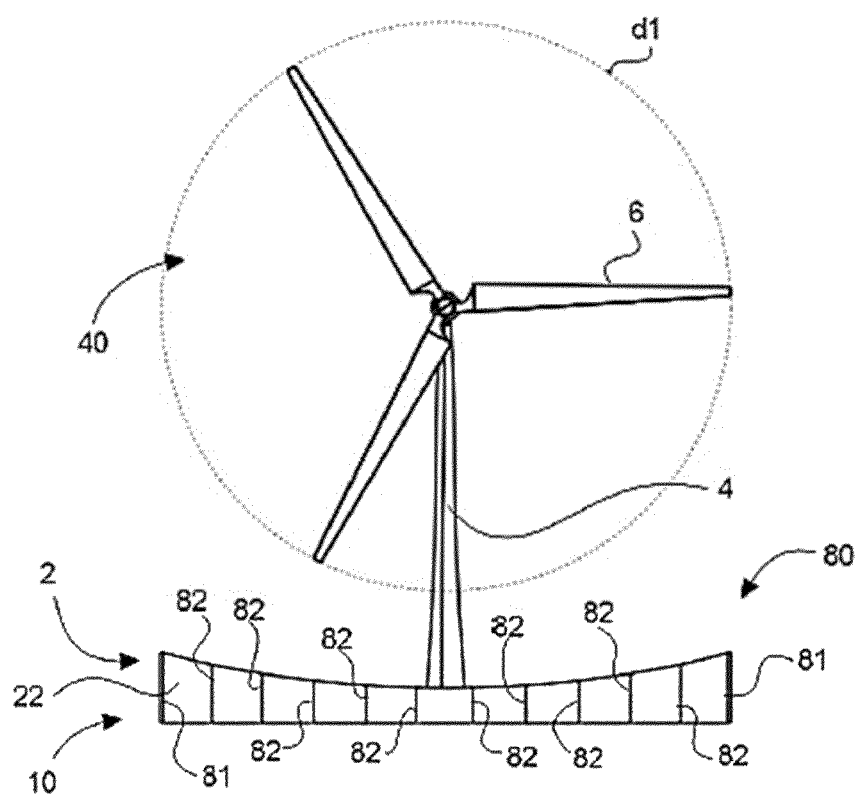
FIG. 13C shows a front view of the example shown in FIG. 13A.

FIG. 13A-13C show an example of a wind guide system (2) having a wind guide (10) arranged at angle between 0°-30° with respect to a vertical axis. The wind guide (10) of FIG. 13A-13C comprises a surface (22) for guiding wind and a structure (80) anchored to a ground supporting the surface (22). The structure comprises two external supporting masts (81) arranged at both sides of the structure (80). In addition, the structure of FIG. 13A-13C comprises one or more internal supporting masts (82) arranged between the external supporting masts (81). In FIG. 13A, the structure comprises ten internal supporting masts, however for clarity purposes only three of them are indicated in FIG. 13A. The internal and the external masts support the surface (22). The surface (22) comprises a concave shape and extends from one external supporting mast to the other external supporting mast through the internal supporting masts. The concave shape of the surface faces the wind flowing towards the wind turbine.

In other examples, the structure (80) may comprise a different number of internal supporting masts (81), e.g. from 1-15.

In some examples, the wind guide (10) may be substantially vertical, i.e. substantially arranged at an angle of 0° with respect to the vertical axis. The wind guide may thus be substantially perpendicular to the ground.

The surface may be made from a flexible material, e.g. a textile or plastic material. In other examples other suitable material configured to block the wind flow may alternatively be used.

In the example of FIG. 13A-13C, the wind guide (10) is arranged in front of the wind turbine. Accordingly, the wind guide system may speed up the wind flowing into the rotor swept area. The wind guide system may additionally speed up a portion of wind flowing from an area surrounding the rotor swept area towards an area behind the rotor swept area not flowing through the rotor. In some examples, the wind guide system (2) may thus speed up the wind flowing to the rotor swept area and to an area behind the rotor swept area.

Alternatively, the wind guide may be arranged behind the wind turbine, e.g. at least partially behind the wind turbine tower. In further examples, the wind guide may be arranged at least partially behind the wind turbine tower.

As shown in FIG. 13B-13C the length of the wind guide may be superior to the diameter d1 of the rotor swept area. In other examples, the distance between the external supporting masts may be substantially similar to the diameter of the rotor swept area.

In further examples, the distance between the external supporting masts may be inferior to the diameter of the rotor swept area.

As may be seen in FIG. 13C, the height of the surface in the central region may be lower than the height in the external regions. The height of the surface in the central region may be e.g. between ⅔ of the external regions. In this figure, the height decrease from the external regions to the central part continuously. In other examples, the height may be reduced in steps.

In the examples of FIG. 13A-13C, the surface is connected to the highest portions of the supporting masts. Therefore, the height of the supporting masts defines the height of the surface. However, in other examples, the surface may be connected at different heights of the supporting masts. For example, the surface may be slidably connected to the supporting elements and thus the height of the surface may be varied.

Figure 14A:
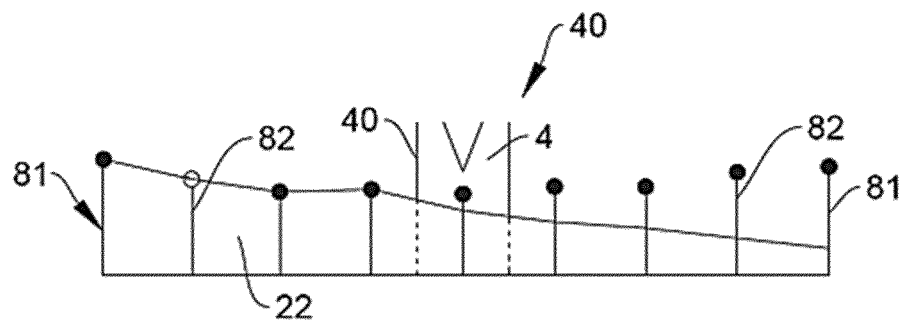
FIG. 14A-14C show examples of a surface configuration according to one example of a wind guide system.
Figure 14B:
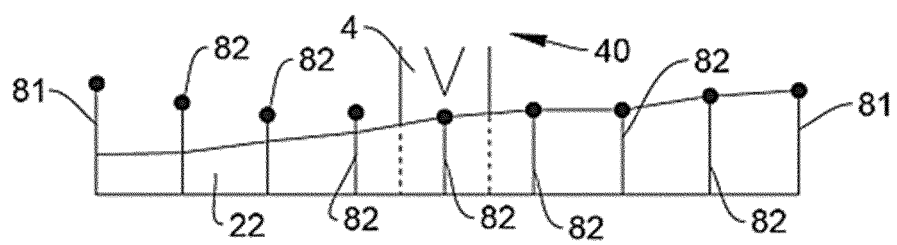
Figure 14C:
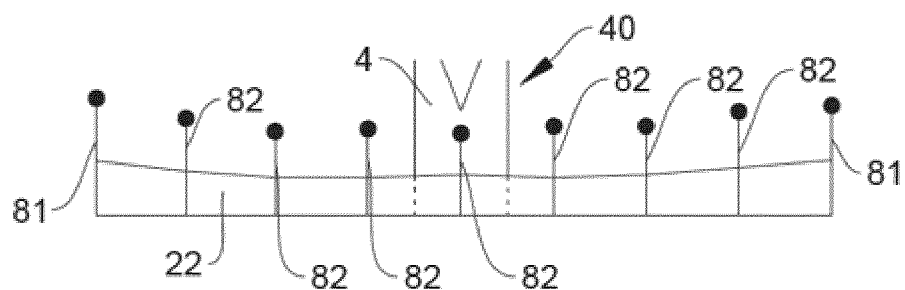

FIG. 14A-14C show examples of a surface configuration of a wind guide system according to one example. As previously described, the height of the surface may be modified. The height and therefore the blocking effect of the wind guide may be adapted to the wind.

In these figures, the surface may be connected at different heights of the supporting masts. In FIG. 14A-14B, the height of the surface decreases from one external supporting mast to the other external supporting mast. Accordingly, the wind speed may be modified differently. For example, in the area of lower height the wind speed is lower than in the area of higher height. This may help to compensate yawing misalignments or differences in the horizontal plane of the wind speed produced e.g. by obstacles raised in front of the wind turbine.

FIG. 14C shows a surface configuration in which the surface is not connected to the top portion of the supporting masts. The surface may be connected to the central regions of the masts. The height of the surface in this configuration may be the half of the maximum height (maximum height understood as the height of the surface if it were connected to the top portion of the supporting masts). The surface may be slidably connected to each of the supporting masts. In this configuration, the wind speed after the wind guide is slightly accelerated. This configuration may be used at high wind speed when it is not necessary to further increase the wind speed.

LIST OF REFERENCE NUMERALS

2 Wind guide system
4 Tower
6 Blade
8 Hub
10 Wind guide structure
12 Front side
14 Rear side
16 Sail member (kite)
18 Wake
20 Wind
22 First surface
24 Second surface
26 Anchoring structure
28 Attachment portion
30, 32 Guiding surface
34 Open area
36 Open area
38 Container
40 Wind turbine
42 Opening
44 Wind guide
46 Sail
48 Kite structure
50 Grid structure
52 Cover structure
54, 54', 54" Pivot
56 Control unit
58 Cable
60 Actuator
62, 62' Support structure
64 Bracket
66 Bracket
68, 68' Wire
70 Wind farm
72 Dragging member
80 Structure
81 External supporting mast
82 Internal supporting mast
G Ground
X, Y, Z, Q Axis
I, II, III, IV Segment
$d_1$ Rotor diameter
$d_2$ Width
$\alpha, \beta, \theta, \omega, \phi_1, \phi_2$ Angle
h Height
F, F', F" Force
W Weight
L, L', L" Lift
D, D', D" Drag force For reasons of completeness, various aspects of the present disclosure are set out in the following numbered clauses:

Clause 1. A wind guide system (2) for guiding the wind (20) in front of and/or above a wind turbine (40) from a first direction to a second direction;
the wind turbine (40) comprising a tower (4) and a rotor provided with a number of rotor blades (6) defining a rotor swept area;
the wind guide system (2) comprising a wind guide (10, 44) arranged and configured to receive wind (20) surrounding the rotor swept area and to change the direction of the wind (20) so that the wind (20) leaving the wind guide (10, 44) has another direction than the wind (20) received by the wind guide (10, 44);
characterised in that the wind guide (10, 44) is arranged and configured to direct the wind (20) surrounding the rotor swept area to an area behind the rotor swept area (18) in such a way that in the area behind the rotor the wind speed is increased and the wind pressure is reduced.

Clause 2. A wind guide system (2) according to clause 1, characterised in that the wind guide (10, 44) comprises a surface (22) that is angled relative to horizontal.

Clause 3. A wind guide system (2) according to clause 2, characterised in that the wind guide (10, 44) comprises the surface (22) that is angled relative to horizontal in such a manner that horizontal wind (20) will be guided in a vertical direction by the surface (22) in such a manner that the wind leaving the wind guide (10, 44) will be directed upwardly so that the wind leaving the wind guide (10, 44) has a non-zero vertical velocity component.

Clause 4. A wind guide system (2) according to any of clauses 2-3, characterised in that the wind guide (10) comprises a ground-mounted wind guide structure (10), said wind guide structure (10) being arranged on the ground (G).

Clause 5. A wind guide system (2) according to clause 4, wherein the wind guide system (2) is configured to guide the wind (20) in front of the wind turbine (40).

Clause 6. A wind guide system (2) according to any of clauses 4-5, characterised in that at least part of the wind guide (10, 44) is arranged in front of the tower (4) of the wind turbine (40).

Clause 7. A wind guide system (2) according to any of clauses 4-6, characterised in that at least part of the wind guide (10, 44) is arranged behind the tower (4) of the wind turbine (40).

Clause 8. A wind guide system (2) according to any of clauses 4-7, characterised in that the wind guide (10) comprises a first surface (22) and a second surface (24) angled relative to each other.

Clause 9. A wind guide system (2) according to any of clauses 4-8, characterised in that the wind guide (10) is attached to the tower (4) of the wind turbine (40).

Clause 10. A wind guide system (2) according to any of clauses 4-9, characterised in that the surface (22) is angled 0-40 degrees, preferably 10-30 degrees, such as 15-25 degrees relative to vertical.

Clause 11. A wind guide system (2) according to any of clauses 4-10, characterised in that the wind guide (10) comprises several separate segments (I, II, III, IV) angled relative to each other.

Clause 12. A wind guide system (2) according to any of clauses 4-11, characterised in that the height (⅔h) of the wind guide structure (10) corresponds to two thirds of the height (h) from the ground (G) to the rotor.

Clause 13. A wind guide system (2) according to any of clauses 4-12, characterised in that the wind guide structure (10) is moveably arranged with respect to the tower (4).

Clause 14. A wind guide system (2) according to any of clauses 2-3, characterised in that the wind guide (10, 44) comprises a ground-mounted wind guide structure (10), said wind guide structure (10) comprising a sail member (16) attached to one or more attachment portions (28) arranged on the ground (G) or on one or more anchoring structures (26) arranged on the ground (G), wherein the sail member comprises a guiding surface (30).

Clause 15. A wind guide system (2) according to clause 14, wherein the wind guide system (2) is configured to guide the wind (20) above of the wind turbine (40).

Clause 16. A wind guide system (2) according to any of clauses 14-15, characterised in that at least part of the wind guide (10, 44) is arranged above the wind turbine (40).

Clause 17. A wind guide system (2) according to any of clauses 14-16, characterised in that at least part of the wind guide (10, 44) is arranged behind the tower (4) of the wind turbine (40).

Clause 18. A wind guide system (2) according to any of clauses 14-17, characterised in that the wind guide (10) comprises a first surface (22) and a second surface (24) angled relative to each other.

Clause 19. A wind guide system (2) according to any of clauses 14-18, characterised in that the wind guide structure (10) is moveably arranged with respect to the tower (4).

Clause 20. A wind guide system (2) according to any of clauses 14-19, wherein the wind guide system comprises a dragging member configured to drag and lift the guiding surface of the wind guide system for deploying the guiding surface from a un-deployed configuration where the guiding surface is arranged on the ground to a deployed configuration in which the guiding surface is deployed above the rotor of the wind turbine.

Clause 21. A wind guide system (2) according to any of clauses 14-20, wherein the guiding surface is arranged in the top portion of the sail member (16).

Clause 22. A wind guide system (2) according to any of clauses 14-21, wherein the guiding surface comprises rigidizing elements arranged at their edges.

Clause 23. A wind guide system (2) according to clause 22, wherein the rigidizing elements comprise an air chamber.

Clause 24. A wind guide system (2) for guiding the wind (20) in front of a wind turbine (40) from a first direction to a second direction;
the wind turbine (40) comprising a tower (4) and a rotor provided with a number of rotor blades (6) defining a rotor swept area;
the wind guide system (2) comprising a wind guide (10, 44) arranged and configured to receive wind (20) surrounding the rotor swept area and to change the direction of the wind (20) so that the wind (20) leaving the wind guide (10, 44) has another direction than the wind (20) received by the wind guide (10, 44);
characterised in that the wind guide (10, 44) is arranged and configured to direct the wind (20) surrounding the rotor swept area to the rotor swept area and to an area behind the rotor swept area (18) in such a way that in the area behind the rotor the wind speed is increased in both the rotor swept area and in the area behind the rotor swept area.

Clause 25. A wind guide system (2) according to clause 24, characterised in that at least part of the wind guide (10, 44) is arranged in front of the wind turbine (40).

Clause 26. A wind guide system (2) according to clause 25, characterised in that the wind guide (10, 44) comprises a surface (22) that is angled relative to horizontal.

Clause 27. A wind guide system (2) according to clause 26, characterised in that the wind guide (10, 44) comprises the surface (22) that is angled relative to horizontal in such a manner that horizontal wind (20) will be guided in a vertical direction by the surface (22) in such a manner that the wind leaving the wind guide (10, 44) will be directed upwardly so that the wind leaving the wind guide (10, 44) has a non-zero vertical velocity component.

Clause 28. A wind guide system (2) according to any of clauses 26-27, characterised in that the wind guide (10) comprises a ground-mounted wind guide structure (10), said wind guide structure (10) being arranged on the ground (G).

Clause 29. A wind guide system (2) according to any of clauses 26-28, characterised in that the wind guide (10) comprises a first surface (22) and a second surface (24) angled relative to each other.

Clause 30. A wind guide system (2) according to any of clauses 26-29, characterised in that the surface (22) is angled 0-40 degrees, preferably 10-30 degrees, such as 15-25 degrees relative to vertical.

Clause 31. A wind guide system (2) according to any of clauses 26-30, characterised in that the wind guide (10) comprises several separate segments (I, II, III, IV) angled relative to each other.

Clause 32. A wind guide system (2) according to any of clauses 26-31, characterised in that the height (⅔h) of the wind guide structure (10) corresponds to two thirds of the height (h) from the ground (G) to the rotor.

Clause 33. A wind guide system (2) according to any of clauses 26-32, characterised in that the wind guide structure (10) is moveably arranged with respect to the tower (4).

Clause 34. A wind guide system (2) according to any of clauses 26-27, characterised in that the wind guide (10, 44) comprises a ground-mounted wind guide structure (10), said wind guide structure (10) comprising a sail member (16) attached to one or more attachment portions (28) arranged on the ground (G) or on one or more anchoring structures (26) arranged on the ground (G), wherein the sail member comprises a first guiding surface (30).

Clause 35. A wind guide system (2) according to clause 34, wherein the wind guide system (2) is further configured to guide the wind (20) above of the wind turbine (40).

Clause 36. A wind guide system (2) according to any of clauses 34-35, wherein the sail member comprises a second guiding surface, wherein the first guiding surface is configured to direct the wind flow towards the area behind the rotor swept area and the second guiding surface is configured to the direct the wind towards the rotor swept area.

Clause 37. A wind guide system (2) according to any of clauses 34-36, wherein the first guiding is arranged in the top portion of the sail member (16).

Clause 38. A wind guide system (2) according to any of clauses 34-37, characterised in that the wind guide structure (10) is moveably arranged with respect to the tower (4).

Clause 39. A wind guide system (2) according to any of clauses 34-38, wherein the wind guide system comprises a dragging member configured to drag and lift a first and/or a second guiding surface of the wind guide system for deploying the first and/or the second guiding surface from a un-deployed configuration where the first and/or the second guiding surface are arranged on the ground to a deployed configuration in which the first and/or the second guiding surfaces are deployed in front of the rotor of the wind turbine.

Clause 40. A wind guide system (2) according to any of clauses 34-39, wherein the first and/or the second guiding surface comprise rigidizing elements arranged at their edges.

Clause 41. A wind guide system (2) according to clause 40, wherein the rigidizing elements comprise an air chamber.

Clause 42. A wind guide system (2) for guiding wind comprising:
a wind guide (10) arranged at an angle of 0°-30° with respect to a vertical axis, the wind guide (10) comprising:
a surface (22) for guiding wind
a structure (80) configured to be anchored to a ground comprising two external supporting masts and one or more internal supporting masts for supporting the surface;
wherein the surface comprises a concave shape and extends from one external supporting mast to the other external supporting mast through the one or more internal supporting masts.

Clause 43. A wind guide system according to clause 42, wherein the surface is made from a flexible material.

Clause 44. A wind guide system according to any of clauses 42-43, wherein the wind guide is arranged in front of a wind turbine (40), the wind turbine comprising a tower (4) and a rotor provided with a number of rotor blades (6) defining a rotor swept area.

Clause 45. A wind guide system according to clause 44, wherein the wind guide is configured to direct wind surrounding rotor swept area to the rotor swept area and to an area behind the rotor swept area.

Clause 46. A wind guide system according to any of clauses 42-43, wherein the wind guide is arranged behind a wind turbine (40), the wind turbine comprising a tower (4) and a rotor provided with a number of rotor blades (6) defining a rotor swept area.

Clause 47. A wind guide system according to clause 46, wherein the wind guide is configured to direct wind surrounding rotor swept area to an area behind the rotor swept area.

Clause 48. A wind guide system according to any of clauses 42-47, the length of the wind guide between the external supporting masts is superior to a diameter of the rotor swept area.

Clause 49. A wind guide system according to any of clauses 42-48, wherein the external supporting masts are taller than the one or more internal supporting masts.

Clause 50. A wind guide system according to any of clauses 42-49, wherein the surface is configured to be connected to a top portion of at least one of the supporting masts.

Clause 51. A wind guide system according to clause 50, wherein the surface is configured to be connected to a position below the top portion of at least one of the supporting masts.

Clause 52. A wind guide system according to any of clauses 42-51, wherein a height of the surface is lower in a central portion than in a height of the surface in the external portions.

Clause 53. A wind guide system according to any of clauses 42-52, wherein a height of the surface decrease from one of the external portion to the other external portion.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the clauses that follow.

The invention claimed is:
1. A wind guide system for guiding wind below a wind turbine rotor of a wind turbine from a first direction to a second direction;
the wind turbine comprising a tower and the wind turbine rotor provided with a number of rotor blades defining a rotor swept area having a diameter equal to a diameter of the wind turbine rotor and through which the rotor blades pass when rotating;
the wind guide system comprising a wind guide arranged and configured to receive wind below the rotor swept area and to change the direction of the wind so that the wind leaving the wind guide has another direction than the wind received by the wind guide;

characterized in that the wind guide is arranged directly underneath the rotor blades of the wind turbine rotor and configured to direct the wind, located below the rotor blades of the wind turbine rotor and the rotor swept area, to an area behind the rotor blades of the wind turbine rotor and the rotor swept area without passing through the rotor swept area such that in the area behind the rotor the wind speed is increased and the wind pressure is reduced.

2. The wind guide system according to claim 1, characterized in that the wind guide comprises a surface that is angled relative to horizontal.

3. The wind guide system according to claim 2, characterized in that the wind guide comprises a surface that is angled relative to horizontal in such a manner that horizontal wind will be guided in a vertical direction by the surface in such a manner that the wind leaving the wind guide will be directed downwardly or upwardly so that the wind leaving the wind guide has a non-zero vertical velocity component.

4. The wind guide system according to claim 3, characterized in that the wind guide comprises a ground-mounted wind guide structure, said wind guide structure being arranged on the ground.

5. The wind guide system according to claim 3, characterized in that the wind guide comprises a ground-mounted wind guide structure, said wind guide structure comprising a sail member attached to one or more attachment portions arranged on the ground or on one or more anchoring structures arranged on the ground.

6. The wind guide system according to claim 3, characterized in that at least part of the wind guide is arranged in front of the tower of the wind turbine.

7. The wind guide system according to claim 3, characterized in that at least part of the wind guide is arranged behind the tower of the wind turbine.

8. The wind guide system according to claim 3, characterized in that the wind guide comprises a first surface and a second surface angled relative to each other.

9. The wind guide system according to claim 3, characterized in that the wind guide is attached to the tower of the wind turbine.

10. The wind guide system according to claim 3, characterized in that the surface is angled 0-40 degrees, preferably 10-30 degrees, such as 15-25 degrees relative to vertical.

11. The wind guide system according to claim 3, characterized in that the wind guide comprises several separate segments angled relative to each other.

12. The wind guide system according to claim 3, characterized in that the height of the wind guide structure corresponds to two thirds of the height from the ground to the rotor.

13. The wind guide system according to claim 3, characterized in that the wind guide structure is moveably arranged with respect to the tower.

14. A method for guiding wind below a wind turbine rotor of a wind turbine from a first direction to a second direction,
the wind turbine comprises a tower and the wind turbine rotor provided with a number of rotor blades defining a rotor swept area having a diameter equal to a diameter of the wind turbine rotor and through which the rotor blades pass when rotating;
wherein said method applies a guide system comprising wind guide arranged and configured to receive wind below the rotor swept area and to change the direction of the wind so that the wind leaving the wind guide has another direction than the wind received by the wind guide, characterized in that the method comprises the following step:
arranging the wind guide in a position and orientation, in which it is arranged directly underneath the rotor blades of the wind turbine rotor and configured to direct the wind, located below the rotor blades of the wind turbine rotor and the rotor swept area, to an area behind the rotor blades of the wind turbine rotor and the rotor swept area without passing through the rotor swept area such that in the area behind the rotor the wind speed is increased and the wind pressure is reduced.

* * * * *